US 12,246,845 B2

(12) United States Patent
Cline et al.

(10) Patent No.: US 12,246,845 B2
(45) Date of Patent: Mar. 11, 2025

(54) METHODS AND APPARATUS FOR MOUNTING A GAS TURBINE ENGINE

(71) Applicants: General Electric Company, Schenectady, NY (US); Safran Aircraft Engines, Paris (FR)

(72) Inventors: Michael Cline, Evendale, OH (US); Jonathan E. Coleman, Evendale, OH (US); Craig W. Higgins, Evendale, OH (US); Daniel E. Mollmann, Evendale, OH (US); Mark E. Linz, Evendale, OH (US); Guillaume Glemarec, Paris (FR); Valerio Capasso, Paris (FR); Jean-Baptiste Manuel Nicolas Vignes, Paris (FR); Nicolas Maurice Hervé Aussedat, Paris (FR); Francois Gallet, Paris (FR)

(73) Assignees: General Electric Company, Evendale, OH (US); Safran Aircraft Engines, Paris (FR)

( * ) Notice: Subject to any disclaimer, the term of this patent is extended or adjusted under 35 U.S.C. 154(b) by 0 days.

(21) Appl. No.: 18/246,478

(22) PCT Filed: May 20, 2021

(86) PCT No.: PCT/US2021/033476
§ 371 (c)(1),
(2) Date: Mar. 23, 2023

(87) PCT Pub. No.: WO2022/245363
PCT Pub. Date: Nov. 24, 2022

(65) Prior Publication Data
US 2023/0356853 A1 Nov. 9, 2023

(51) Int. Cl.
*B64D 27/40* (2024.01)

(52) U.S. Cl.
CPC ............ *B64D 27/40* (2024.01); *B64D 27/406* (2024.01)

(58) Field of Classification Search
CPC ..... B64D 27/40; B64D 27/404; B64D 27/406
See application file for complete search history.

(56) References Cited

U.S. PATENT DOCUMENTS

| 4,458,863 A | 7/1984 | Smith |
| 5,238,206 A | 8/1993 | Pachomoff |

(Continued)

FOREIGN PATENT DOCUMENTS

| EP | 0879759 | 11/1998 |
| EP | 3216699 A1 | 9/2017 |

(Continued)

OTHER PUBLICATIONS

International Searching Authority, "International Search Report and Written Opinion," issued Jan. 31, 2022 in connection with International Patent Application No. PCT/US2021/033476, 20 pages.

(Continued)

*Primary Examiner* — Michael C Zarroli
*Assistant Examiner* — Peter A Taraschi
(74) *Attorney, Agent, or Firm* — Hanley, Flight & Zimmerman, LLC

(57) ABSTRACT

Methods, apparatus, systems and articles of manufacture for mounting a gas turbine engine are described. An apparatus for mounting a gas turbine engine to a pylon, the gas turbine including an upstream section and a downstream section, the gas turbine defining a roll axis, a yaw axis, and a pitch axis, the apparatus including: a first mount to couple the upstream section of the gas turbine engine to the pylon; a second mount to couple the upstream section of the gas turbine engine to the pylon, the second mount downstream of the first mount; a thrust linkage to couple the upstream section (Continued)

to the pylon, wherein the downstream section is decouplable from the upstream section without decoupling the first mount, the second mount, and the thrust linkage.

20 Claims, 15 Drawing Sheets

(56) References Cited

U.S. PATENT DOCUMENTS

| | | | |
|---|---|---|---|
| 5,320,307 | A | 6/1994 | Spofford et al. |
| 5,409,184 | A | 4/1995 | Udall et al. |
| 5,873,547 | A | 2/1999 | Dunstan |
| 5,873,549 | A | 2/1999 | Lane et al. |
| 6,330,985 | B1 | 12/2001 | Manteiga et al. |
| 8,727,269 | B2 | 5/2014 | Stuart et al. |
| 8,955,304 | B2 | 2/2015 | Suciu et al. |
| 9,637,241 | B2 | 5/2017 | Schnelz |
| 10,436,063 | B2 | 10/2019 | McMahon et al. |
| 10,647,440 | B2 | 5/2020 | Bouchet et al. |
| 10,760,589 | B2 | 9/2020 | Moniz et al. |
| 2014/0369810 | A1 | 12/2014 | Binks et al. |
| 2015/0175268 | A1* | 6/2015 | Guillou .......... B64D 27/40 |
| | | | 244/54 |
| 2017/0057652 | A1* | 3/2017 | Journade .......... F02C 7/20 |
| 2018/0362170 | A1* | 12/2018 | Stuart .......... B64D 29/02 |
| 2020/0308988 | A1 | 10/2020 | Troop et al. |

FOREIGN PATENT DOCUMENTS

| | | |
|---|---|---|
| EP | 3453849 A2 | 3/2019 |
| GB | 1520759 | 8/1978 |
| WO | 2022245363 | 11/2022 |

OTHER PUBLICATIONS

European Patent Office, "Extended European Search Report," issued in connection with European Patent Application No. 24188712.4, dated Sep. 30, 2024, 11 pages.

* cited by examiner

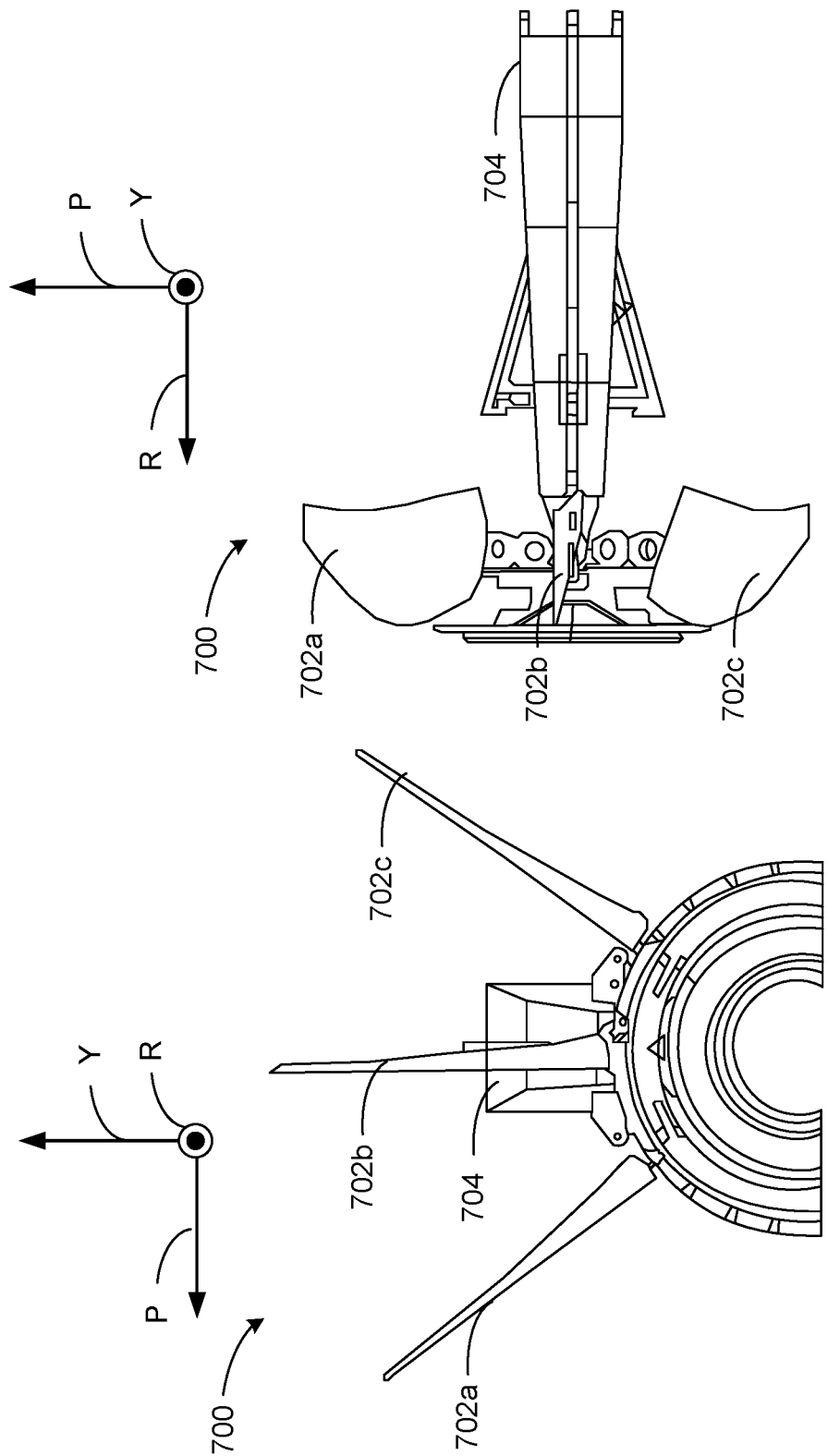

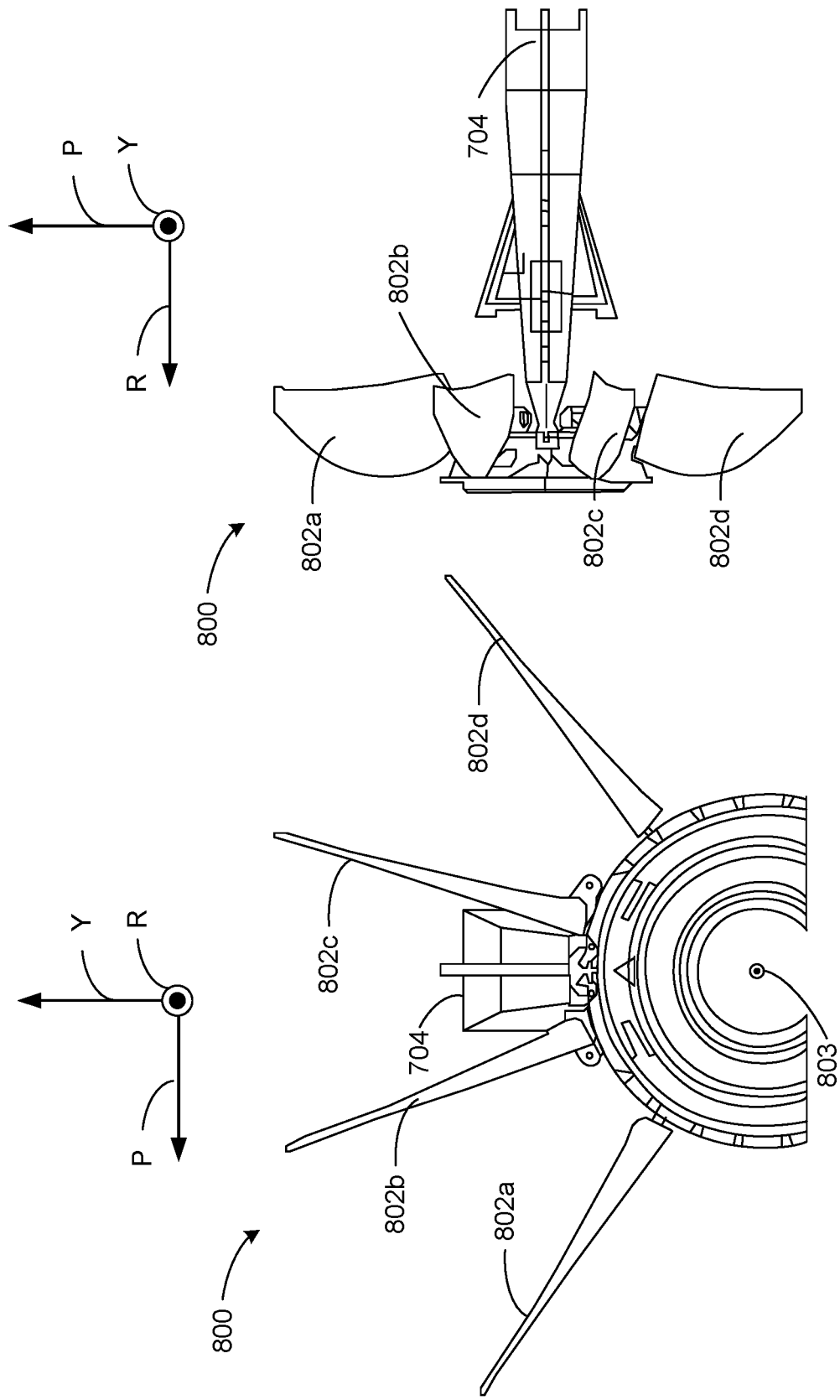

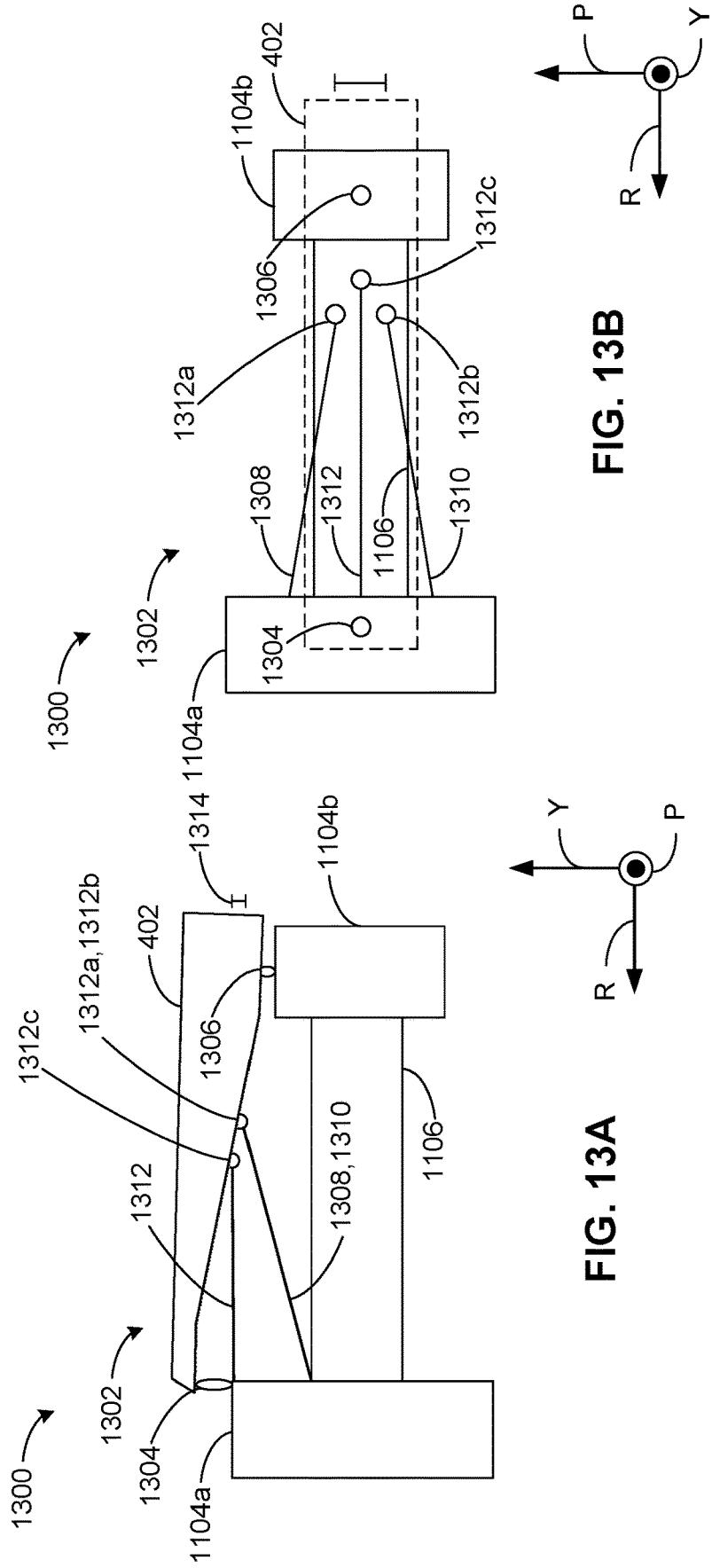

METHODS AND APPARATUS FOR MOUNTING A GAS TURBINE ENGINE

FIELD OF THE DISCLOSURE

This disclosure relates generally to gas turbines, and, more particularly, to methods and apparatus for mounting a gas turbine engine to a pylon.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

A gas turbine engine produces a thrust that propels a vehicle forward, e.g., a passenger aircraft. The thrust from the engine transmits loads to a wing mount, e.g., a pylon, and likewise the vehicle applies equal and opposite reaction forces onto the wing. This loading induces a pitch moment and a yaw moment into the engine. There is a continuing need to reduce both the pitch and yaw moment applied to the engine.

BRIEF SUMMARY

Aspects and advantages of the invention will be set forth in part in the following description, or may be obvious from the description, or may be learned through practice of the invention. In one aspect, the present disclosure is directed towards an apparatus.

The example apparatus is for mounting a gas turbine to a pylon, the gas turbine including an upstream section and a downstream section, the gas turbine defining a roll axis, a yaw axis, and a pitch axis, the apparatus includes a first mount to couple the upstream section of the gas turbine engine to the pylon, a second mount to couple the upstream section of the gas turbine engine to the pylon, the second mount downstream of the first mount, and a thrust linkage to couple the upstream section to the pylon, wherein the downstream section is decouplable from the upstream section without decoupling the first mount, the second mount, and the thrust linkage.

A further aspect of the disclosure is directed towards a gas turbine engine defining a roll axis, a yaw axis, and a pitch axis, the gas turbine engine including a first section, a second section coupled to the first section, the second section downstream from the first section, a first mount to couple the first section of the gas turbine engine to the pylon, a second mount to couple the first section of the gas turbine engine to the pylon, the second mount downstream of the first mount, and a thrust linkage to couple the first section to the pylon, wherein the second section is decouplable from upstream section without decoupling the first mount, the second mount, and the thrust linkage.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 7A is a front view of a first configuration of a first outer guide vane, a second outer guide vane, and a third outer guide vane relative to a pylon;

FIG. 7B is a top view of the first configuration of FIG. 7A of the outer guide vanes;

FIG. 8A is a front view of a second configuration of a first outer guide vane, a second outer guide vane, a third outer guide vane, and a fourth outer guide vane relative to a pylon;

FIG. 8B is a top view of the second configuration of FIG. 8A of the outer guide vanes;

FIG. 13A is a simplified block diagram of an engine depicting a side view of a triple thrust linkage system; and FIG. 13B is a simplified block diagram of an engine depicting a top view of a triple thrust linkage system.

Figure 1:
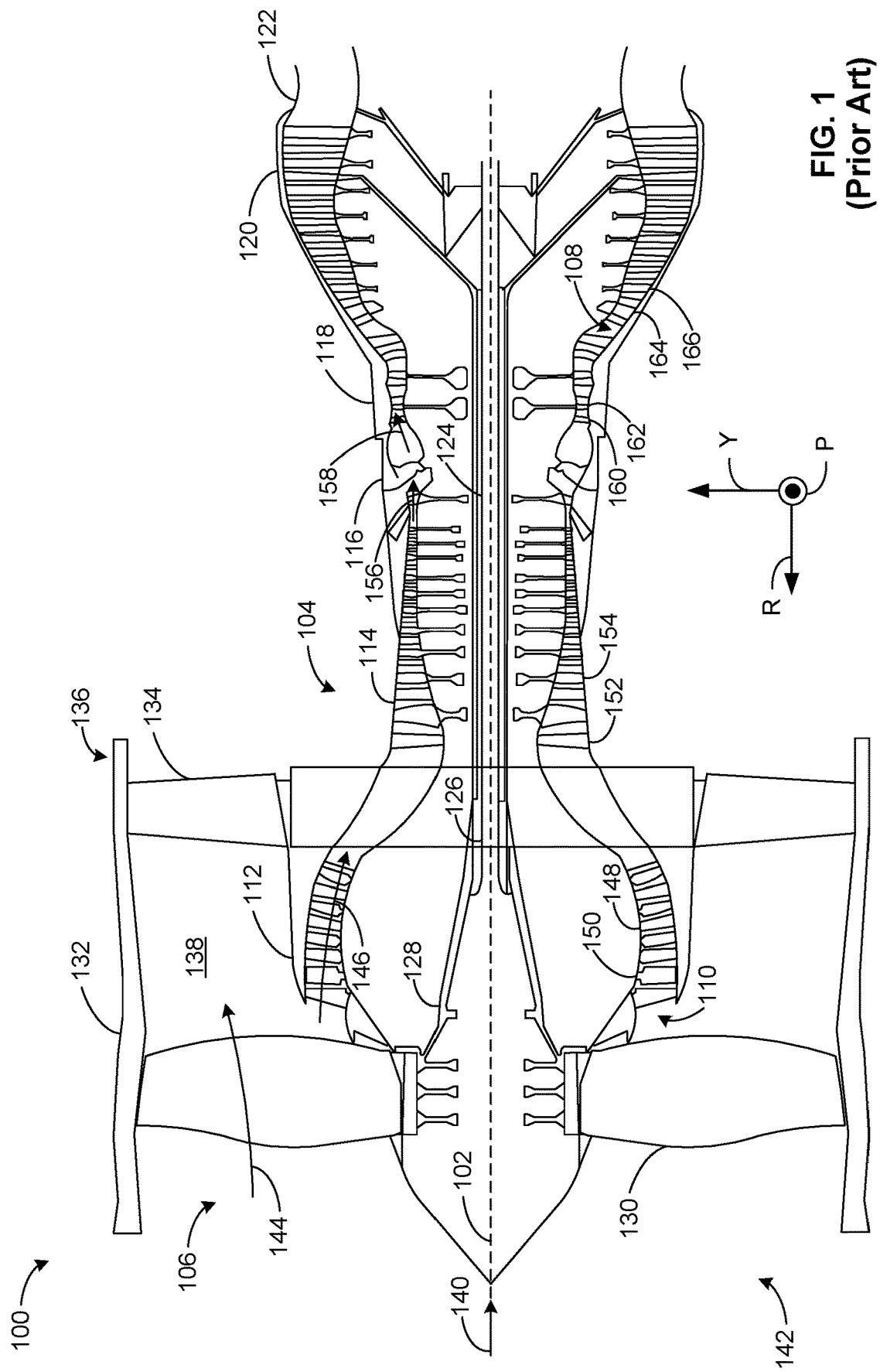
FIG. 1 illustrates a cross-sectional view of a prior-art gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Compressor blade tip clearances in gas turbine engines are reduced by operational distortions caused by internal forces of the gas turbine engines. Particularly, thrust and aero inlet loads can create internal bending moments in the gas turbine engine, which can cause the gas turbine engine to bend between the mounting linkages of the gas turbine engines. Certain examples disclosed herein provide a mounting system to react some or all of the bending moments between thrust linkages of the engine, which reduces the operational distortions caused by bending moments transferred by carcass of the gas turbine engine. Other examples disclosed herein provide a gas turbine with a cantilevered core, which improves access to the engine core during maintenance and disassembly and reduces stress in the engine core.

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with reference to the axial direction, radial direction, and circumferential direction of the gas turbine associated with the features, forces and moments. In general, the attached figures are annotated with a set of axes including the roll axis R, the pitch axis P, and the yaw axis Y. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines can be mounted to the wings of the aircrafts (e.g., under-wing mounting) via a pylon. These pylons transfer the loads associated with the operation of gas turbine engines (e.g., thrust loads, aero-inlet loads, weight, etc.) to the wing of the aircraft. In some examples, the gas turbine engine is mounted to the pylon via a forward mount and an aft mount for the engine. In some prior-art examples, the forward mount couples the fan casing of the gas turbine engine to the pylon and the aft mount couples the core casing of the gas turbine engine to the gas turbine engine.

Blade tip clearances at several locations throughout the engine are often defined based on the sum of axisymmetric closures and the local circumferential clearance distortions during a take-off (TO) rotation maneuver. That is, in some examples, the minimum blade tip clearances in the compressor (e.g., closest clearances, etc.) can occur during TO engine operation. In some examples, the minimum blade tip clearance at which the compressor can operate during take-off is based on clearance reduction caused in part by engine vibrations and distortion (e.g., strain, etc.) caused by operation of the engine. Operational distortion in an engine can be caused by internal forces and/or moments in the engine caused by thrust and aero inlet loads, etc. The operational loads can cause the engine body to bend and/or otherwise distort between the forward and aft mount attachment point of engine to the aircraft, for example. Designing an engine to compensate for these distortions (e.g., by increasing cold or cruise clearances) correspondingly reduces engine operating efficiency (e.g., specific fuel consumption, etc.). In some prior-art engine configurations, the generated bending moments (e.g., moments about the yaw and pitch axis, etc.) are reacted through the engine carcass (e.g., the fan and core sections of the engine, etc.). The reaction of the bending moments through the engine carcass can cause deterioration (e.g., deformation, distortion) of the engine, which in turn affect blade tip clearances. As such, a mounting system that causes the pitch and/or yaw moments to be reacted outside of the engine carcass (e.g., by thrust linkages, etc.) reduces the necessary cold clearances, which improves engine efficiency (e.g., specific fuel consumption, etc.), improves engine operability, and reduces engine deformation (e.g., deterioration, distortion, etc.), for example.

Examples disclosed herein mitigate these deformations using engine mounting configurations which reduce and/or eliminate bending moments transferred through the engine carcass. Some examples disclosed herein include a gas turbine engine with a cantilever mounting configuration. In some such examples, the aft and forward mounts of the gas turbine engine are located on forward sections of the engine casing, which prevents downstream sections of the engine from reacting bending moments between the aft and forward section and enables the on-wing removal of these downstream sections. Some examples disclosed herein include multiple offset thrust linkages, which prevents pitch and/or yaw bending moments from being reacted between the forward and aft sections. Some examples disclosed herein include mounts with pylon internal mount fastening features, which improves packaging space and reduces ground clearance parameters.

Referring now to the drawings, wherein identical numerals indicate the same elements throughout the figures, FIG. 1 is a schematic cross-sectional view of a prior-art turbofan-type gas turbine engine 100 ("turbofan 100"). As shown in FIG. 1, the turbofan 100 defines a longitudinal or axial centerline axis 102 extending therethrough for reference. In general, the turbofan 100 includes a core section 104 disposed downstream from a fan section 106.

The core section 104 generally includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (i.e., a direct-drive configuration).

As shown in FIG. 1, the fan section 106 includes a plurality of fan blades 130 coupled to and extending radially outwardly from the fan shaft 128. An annular fan casing 132, (e.g., a nacelle, etc.) circumferentially encloses the fan section 106 and/or at least a portion of the core section 104. The annular fan casing 132 is supported relative to the core section 104 by a plurality of circumferentially-spaced apart outlet guide vanes 134. Furthermore, a downstream section 136 of the annular fan casing 132 can enclose an outer portion of the core section 104 to define a bypass airflow passage 138 therebetween.

As illustrated in FIG. 1, air 140 enters an inlet portion 142 of the turbofan 100 during operation thereof. A first portion 144 of the air 140 flows into the bypass flow passage 138, while a second portion 146 of the air 140 flows into the inlet 110 of the LP compressor 112. One or more sequential stages of LP compressor stator vanes 148 and LP compressor rotor blades 150 coupled to the LP shaft 126 progressively compress the second portion 146 of the air 140 flowing through the LP compressor 112 en route to the HP compressor 114. Next, one or more sequential stages of HP compressor stator vanes 152 and HP compressor rotor blades 154 coupled to the HP shaft 124 further compress the second portion 146 of the air 140 flowing through the HP compressor 114. This provides compressed air 156 to the combustion section 116 where it mixes with fuel and burns to provide combustion gases 158.

The combustion gases 158 flow through the HP turbine 118 in which one or more sequential stages of HP turbine stator vanes 160 and HP turbine rotor blades 162 coupled to the HP shaft 124 extract a first portion of kinetic and/or thermal energy from the combustion gases 158 This energy extraction supports operation of the HP compressor 114. The combustion gases 158 then flow through the LP turbine 120 where one or more sequential stages of LP turbine stator vanes 164 and LP turbine rotor blades 166 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 158 then exit the core section 104 through the exhaust section 122 thereof.

Figure 2:
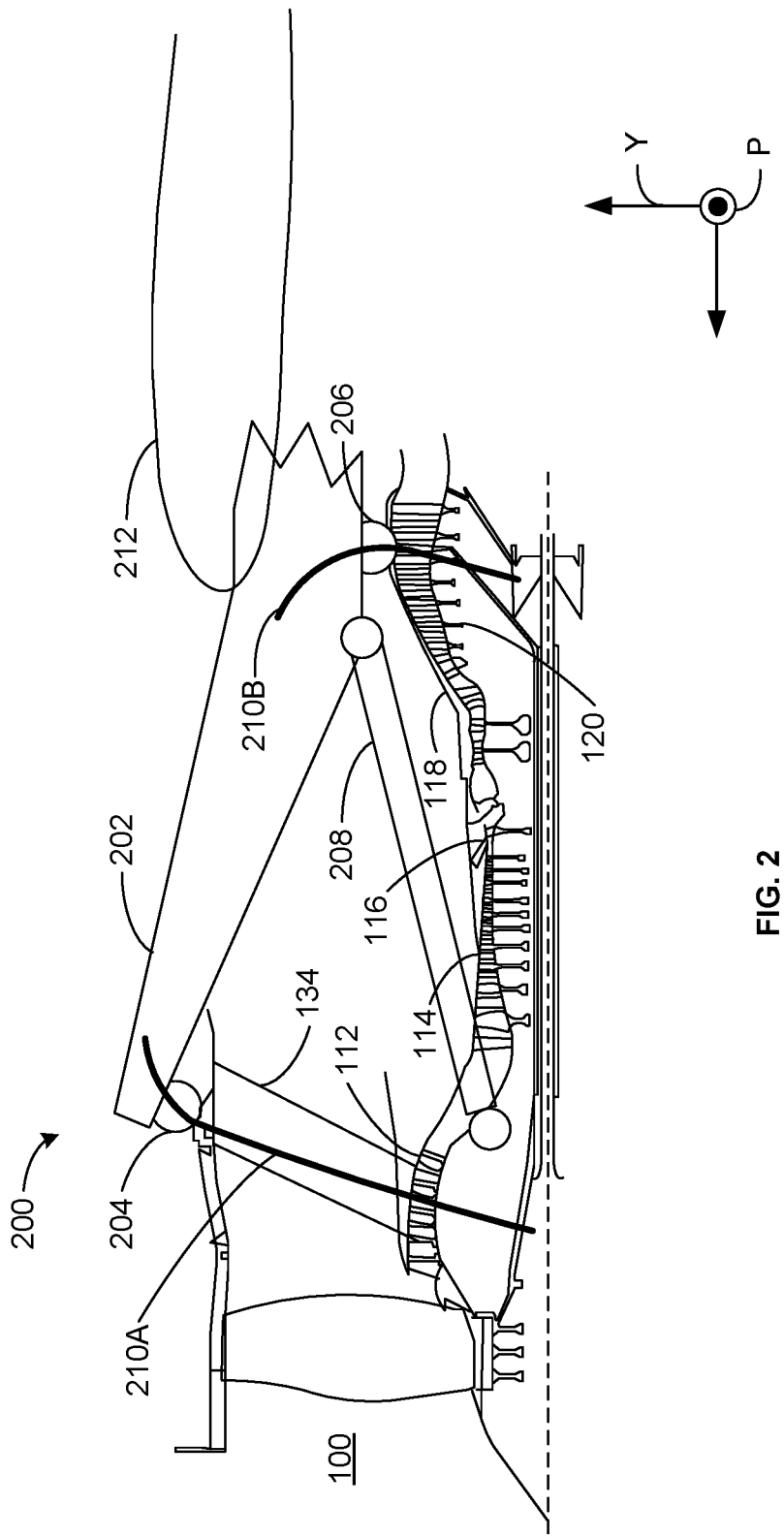
FIG. 2 illustrates a cross-sectional view of the prior-art gas turbine engine of FIG. 1 mounted to a wing via a prior-art mounting configuration.
Figure 3:
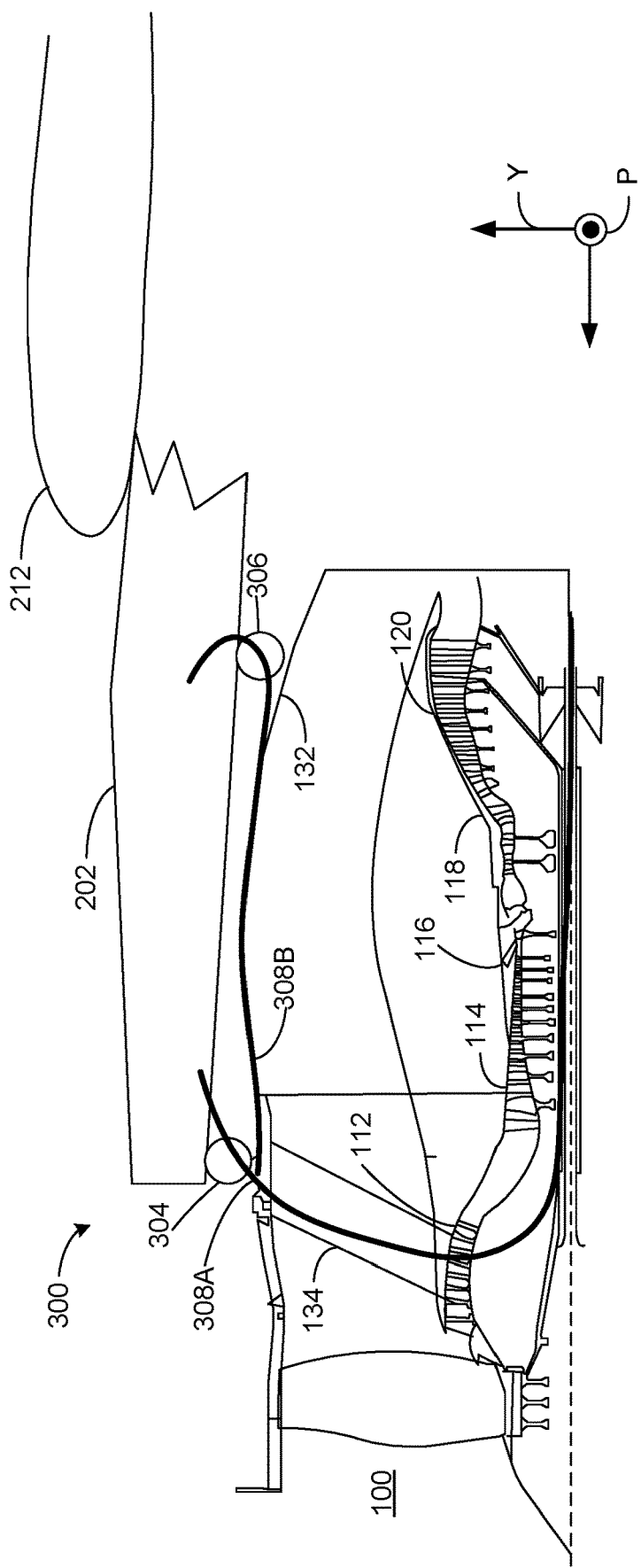
FIG. 3 illustrates a cross-sectional view of a prior-art gas turbine engine that is mounted on a wing via another prior-art mounting configuration.

The prior-art mounting configurations of FIGS. 2-3 are described with reference to the engine components described in conjunction with FIG. 1. However, the prior-art mounting configurations of FIGS. 2-3 are illustrated on different gas turbine engines than the one illustrated in FIG. 1. The repeated part numbers are for descriptive purposes only.

FIG. 2 illustrates a cross sectional view of the prior-art gas turbine engine 100 of FIG. 1 via a first prior-art mounting configuration 200. The first prior-art mounting configuration 200 includes a pylon 202, which is coupled to the gas turbine engine 100 via a forward mount 204, an aft mount 206, and a thrust linkage 208. A portion of the weight and operational stresses of the engine are reacted between the mounts 204, 206, which defines engine off, no-aerodynamic force, load paths 210A, 210B, respectively. The thrust linkage 208 reacts the axial stress of the weight and operational stresses. The pylon 202 is coupled to a plane wing 212. The load paths 210A, 210B illustrate that the operational stress of the gas turbine engine 100 is carried through the outer guide vane(s) 134 and the flow path components of the engine (e.g., the LP compressor 112, the HP compressor 114, the combustor, 116, the HP turbine 118, the LP turbine 120, etc.). In other examples, if the gas turbine engine 100 is operating or the undergoing aerodynamic loading, additional load will be transferred via the thrust linkage 208. As such, the flow path components of the gas turbine engine 100 are distorted by the bending moments reacted between the mounts 204, 206, which can affect blade tip clearance and engine performance.

FIG. 3 illustrates a cross sectional view of the prior-art gas turbine engine 100 of FIG. 1 via a second prior-art mounting configuration 300. The second prior-art mounting configuration 300 includes a pylon 202, which is coupled to the gas turbine engine 100 via a forward mount 304 and an aft mount 306. The weight and operational stresses of the engine are reacted between the mounts 304, 306, which defines load paths 308A, 308B. The pylon 202 is coupled to the plane wing 212. In FIG. 3, the mounts 304, 306 are coupled to the annular fan casing 132 of the gas turbine engine 100. The load paths 308A, 308B illustrates the operational stress of the engine 100 is carried through the annular fan casing 132 and the outer guide vane(s) 134. In the prior-art example of FIG. 2, the bending moments between the mounts 304, 306 are reacted through the annular fan casing 132 and not the flow components 112, 114, 116, 118, 120. As such, the distortions and/or other deterioration caused by the bending moments are reduced and/or mitigated. However, in some examples, the annular fan casing 132 must be removed in order to inspect, clean, or maintain the gas turbine engine 100, which can greatly increase maintenance and inspection times.

The following examples refer to gas turbine engines and mounting configurations that are similar to those described with reference to FIGS. 1-3, except that the engine and mounting system include features which reduce and/or eliminate bending moments transferred through the engine carcass. When the same element number is used in connection with FIGS. 4A-13B as was used in FIGS. 1-3, it has the same meaning unless indicated otherwise.

Figure 4A:
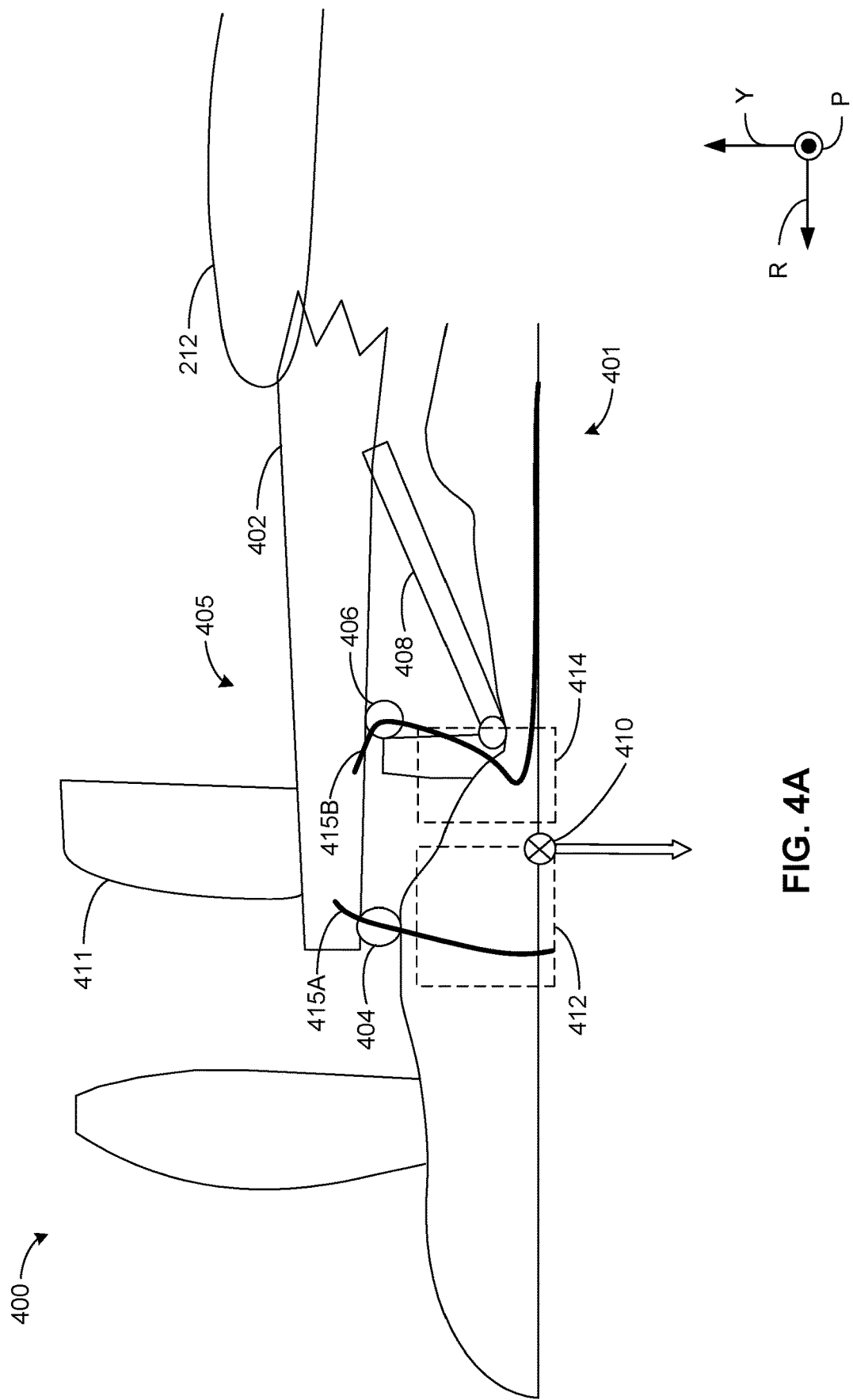
FIG. 4A illustrates a gas turbine engine with a cantilevered core in which the teachings of this disclosure can be implemented.

FIG. 4A illustrates a gas turbine engine 400 with a cantilevered core section 401 in which the teachings of this disclosure can be implemented. In the illustrated example of FIG. 4A, the gas turbine engine 400 has an example mount configuration 405. The example mount configuration 405 includes a pylon 402 that couples the gas turbine engine 400 to the wing 212. The gas turbine engine 400 is coupled to the pylon 402 via a front mount 404 and an aft mount 406 and one or more thrust linkage(s) 408 In some examples, the thrust linkage(s) 408 are described as thrust linkage(s) 408. The forces and moments generated by the weight and operation of the gas turbine engine 400 are reacted between the mounts 404, 406 and thrust linkage(s) 408.

Figure 4B:
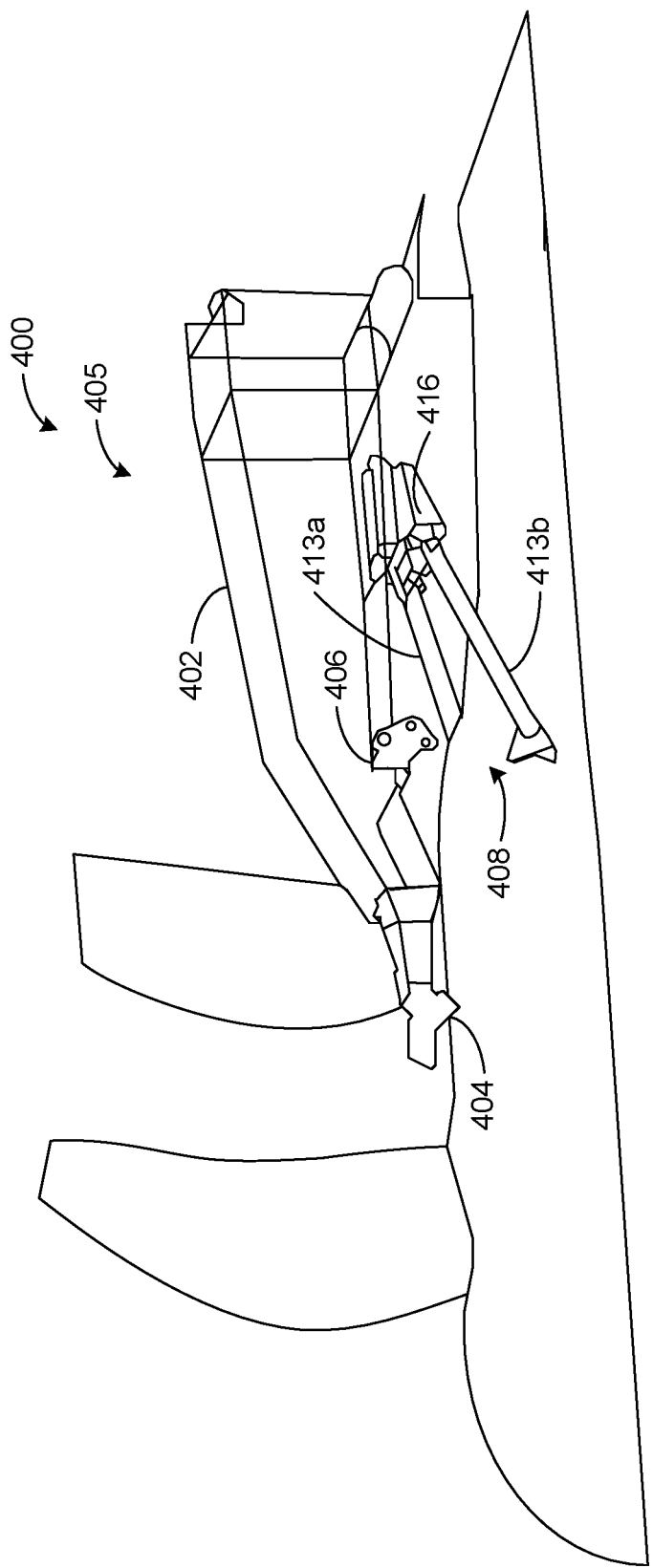
FIG. 4B illustrates a perspective view of the engine of FIG. 4A depicting the mounting of the engine.

In FIG. 4A, the weight of the gas turbine engine 400 acts at a center of gravity 410, which is between the mounts 404, 406. The mounts 404, 406 are coupled to a front frame 412 and an intermediate compressor frame 414, respectively. An example implementation of the front mount 404 is described in FIG. 5A. An example implementation of the aft mount is described in conjunction with FIGS. 5A-6. The example intermediate compressor frame 414 is additionally coupled to the pylon 402 by example thrust linkage(s) 408. The mounts 404, 406 and thrust linkage(s) 408 fully constrain the movement of the gas turbine engine 400. That is, each of the six degrees of freedom of the gas turbine engine 400 are reacted via the mounts 404, 406 and thrust linkage(s) 408. In FIG. 4, both the forward mount 404 and the aft mount 406 react vertical and lateral loads associated with gas turbine engine 400, which defines an engine off, no-aerodynamic force load paths 415A, 415B. The load paths 415A, 415B flows between the mounts 404, 406, which minimizes the distortive effect on the flow path components of the gas turbine engine 400. In other examples, if the gas turbine engine 100 is operating or the undergoing aerodynamic loading, additional load will be transferred via the thrust linkage 408. As such, the yaw and pitch moments of the gas turbine (e.g., generated during operation of the gas turbine engine, etc.) are reacted by and between the mounts 404, 406 via an imbalance of vertical and lateral loads at each of the mounts 404, 406. As such, the distortions associated with these bending moments are limited to the engine components between the mount 404, 406 (e.g., the LP compressor 112 and HP compressor 114, etc.). A simplified illustration showing the constraint of the degrees of freedom of the gas turbine engine 400 is described below in conjunction with FIG. 4B. The example outer guide vane(s) 411 are generally configured to guide air through bypass of the gas turbine engine 400. In FIG. 4A, the placement of the outer guide vanes 411 are not hindered by the mounting configuration 405 (e.g., the placement of the thrust linkage(s) 408, the front mount 404, or the example aft mount 406 does not inhibit the packaging of the outer guide vane(s) 411, etc.). The example outer guide vane(s) 411 can be positioned vertically, as shown in FIG. 4A. Example implementations of the outer guide vane(s) 411 is further described below in conjunction with FIGS. 7A-B and 8A-B.

FIG. 4B is a perspective view of the gas turbine engine 400 of FIG. 4A that illustrates how the mounting configuration 405 constrains each of the degrees of freedom of the gas turbine engine 400. The mounting configuration 405 includes the front mount 404, the aft mount 406 and the thrust linkage(s) 408. In FIG. 4B, the thrust linkage(s) 408 include a first thrust linkage 413a and a second thrust linkage 413b, which are coupled to the pylon 402 via a yoke 416. While the thrust linkage(s) 408 are depicted as the first thrust linkage 413a and the second thrust linkage 413b in the example of FIG. 4B, the thrust linkages 413a, 413b can be implemented as a single thrust linkage or three thrust linkages, etc.

In FIG. 4B, both the front mount 404 and aft mount 406 are configured to constrain vertical and lateral forces during engine operation. Imbalances in the vertical and lateral forces additionally cause the front mount 404 and aft mount 406, collectively, to react yaw and pitch moments associated with the gas turbine engine 400. Additionally, in FIG. 4B, the aft mount 406 is configured to restrain roll moments associated with the gas turbine engine 400. The thrust linkage(s) 408 (e.g., first thrust linkage 413a and second thrust linkage 413b) constrain the axial forces associated with the gas turbine engine 400. As such, in combination, the forward mount 404, the aft mount 406 and thrust linkage(s) 408 constrain the six degrees of freedom of the gas turbine engine (e.g., vertical translation, lateral translation, axial translation, rotation about the yaw axis, rotation about the pitch axis, and rotation about the roll axis). The mounting configuration 405 of the forward mount 404, the aft mount 406 and thrust linkage(s) 408 cause the gas turbine engine 400 to be statically determinate. Other mounting configurations implemented in accordance with the teachings of this disclosure can be statically indeterminate.

The first thrust linkage 413a and the second thrust linkage 413b are joined via an example yoke 416. In FIG. 4B, the yoke 416 is a whiffletree linkage. The yoke 416 distributes axial loads evenly between the thrust linkage(s) 408. Accordingly, the yoke 416 prevents imbalances in the axial load on the thrust linkage(s) 408 which prevents the thrust linkage(s) 408 from constraining a bending moment therebetween. Examples including multiple thrust linkages constraining bending moments are described below.

Figure 5A:
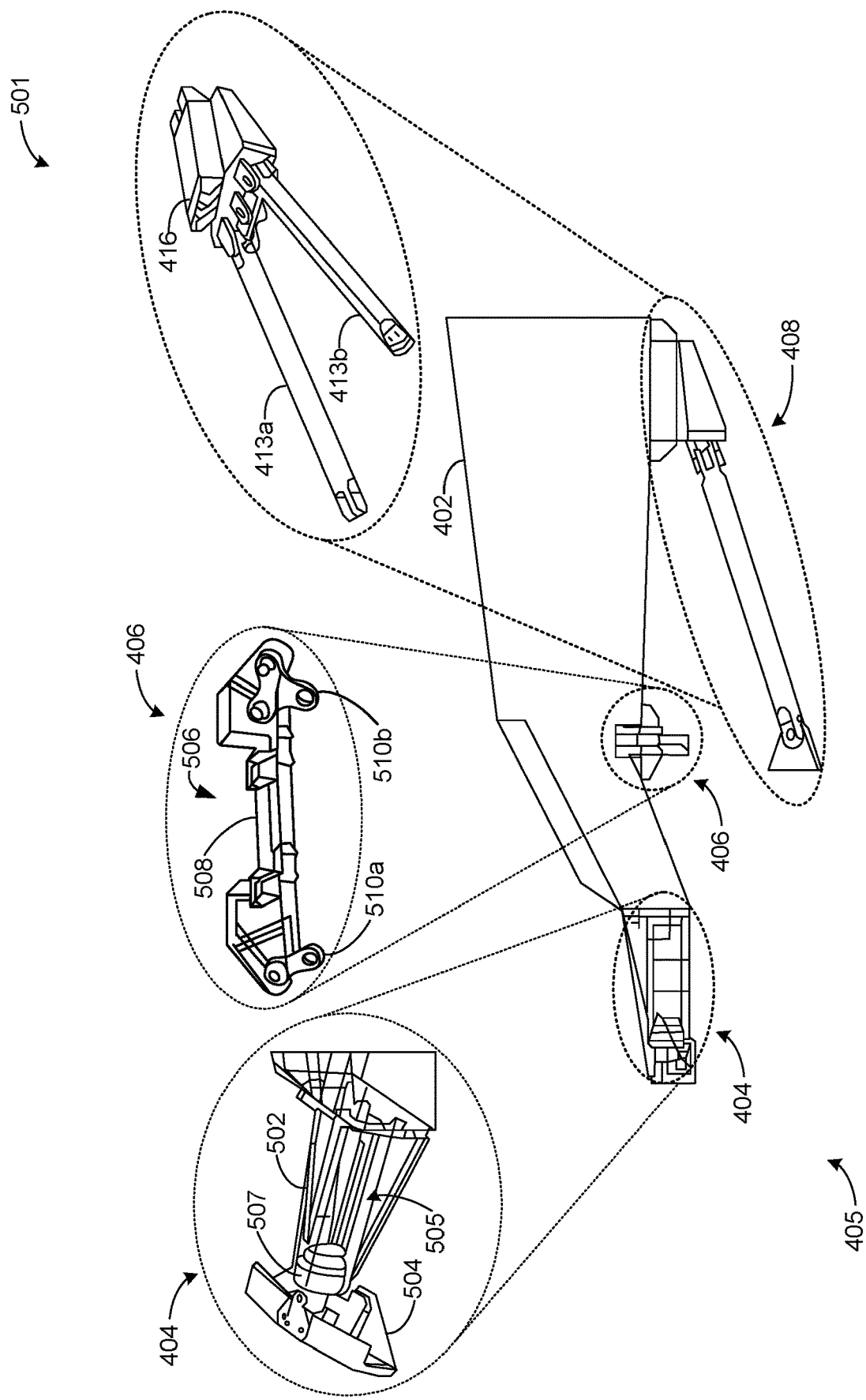
FIG. 5A is a perspective view of an example implementation of the mount configuration and pylon of FIG. 4B including detailed views of the mounts and the thrust linkages of FIG. 4B.

FIG. 5A is a perspective view of an example implementation 501 of the mount configuration 405 and the pylon 402 of FIGS. 4A-B including a detailed view of the mounts 404, 406 and the thrust linkage(s) 408 of FIGS. 4A-B. In FIG. 5A, the forward mount 404 is implemented by a trunnion 502, and the aft mount 406 is implemented by a yoke 506.

The trunnion 502 includes a linkage 504. The trunnion 502 and linkage 504 constrain two degrees of freedom of the engine, namely, lateral and vertical translation. In other examples, the trunnion 502 can include additional features which can constrain additional degrees of freedom. For example, the trunnion 502 can include any additional linkage to constrain rotation along the roll axis. In FIG. 5A, the trunnion 502 acts as a ball joint, which implements the linkage 504 as a pivot linkage. In the example of FIG. 5A, an axle 505 is attached (e.g., fixed, mounted, fastened) to the example trunnion 502 and ball joint 507 is attached (e.g., fixed, mounted, fastened) to the example pylon 402. The example trunnion 502 (e.g., front mount 404 of FIG. 4A) supports the weight of the front frame of the engine (not shown in this view).

The yoke 506 includes a yoke body 508, a first linkage 510a, and a second linkage 510b. In FIG. 5A, the first linkage 510a includes a two pronged linkage and the second linkage 510b includes a three prong linkage. The second linkage 510b of the yoke 506 prevents rotation about the roll axis. In the illustrated example of FIG. 5A, the yoke 506 is an external feature. In other examples, the yoke 506 can be integrated into the pylon 402. An example implementation of an aft mount 406 is discussed below in conjunction with FIG. 6.

Figure 5B:
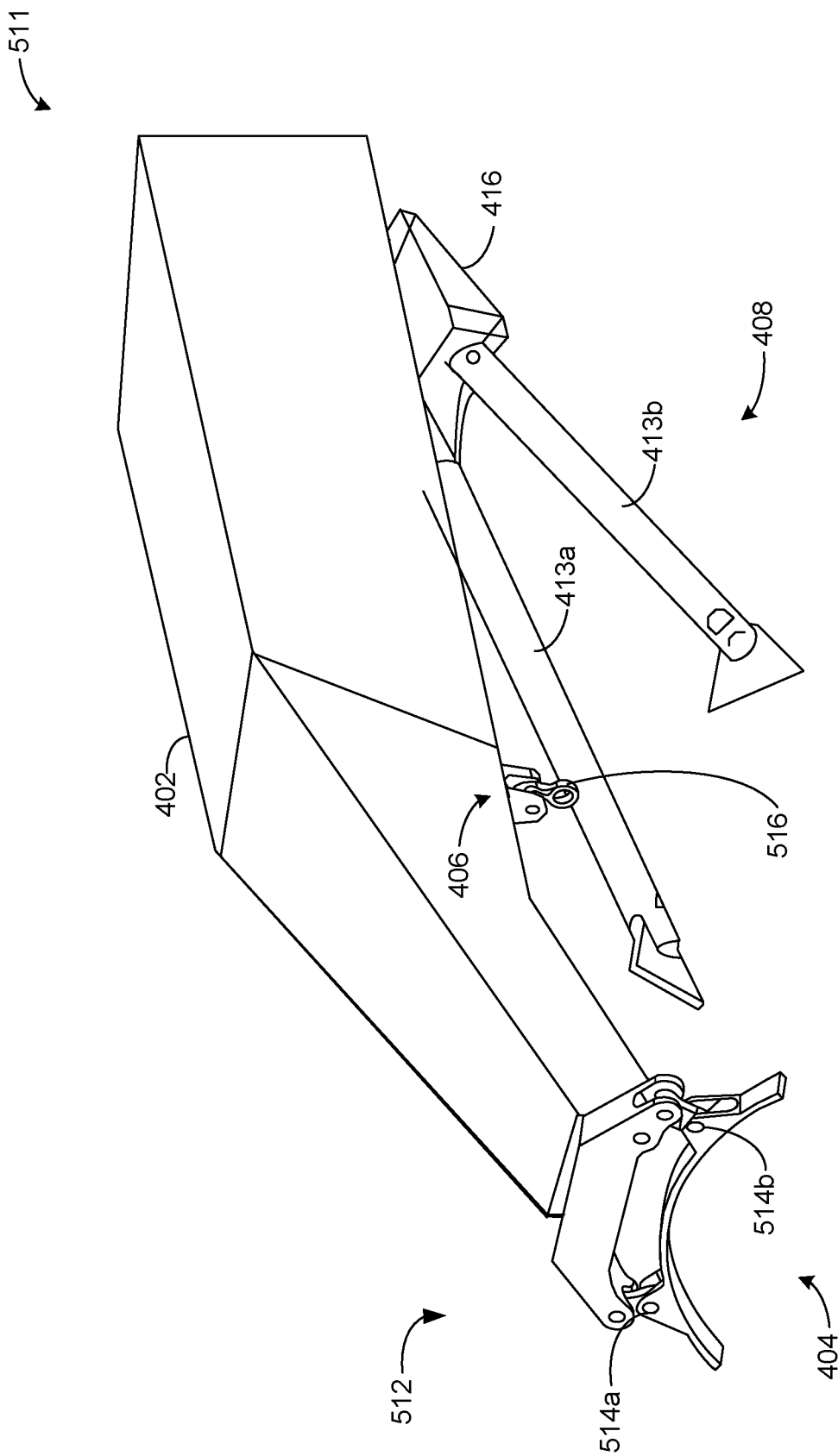
FIG. 5B is a perspective view of an example variant of the mount configuration and pylon of FIG. 4B.

FIG. 5B is a perspective view of another example implementation 511 of the mount configuration 405 and the pylon 402 of FIGS. 4A-B. In FIG. 5B, the forward mount 404 is implemented by a forward yoke system 512, the aft mount 406 is implemented by an aft link 516. The implementation 511 occupies less space (e.g., less bulky) in the area of the core engine than the implementation 501 than FIG. 5A, but reacts more load at the forward end of the pylon (e.g., at the yoke system 512, etc.) The forward yoke system 512 includes a first linkage 514a, and a second linkage 514b. The forward yoke system constrains three degrees of freedom, namely, lateral translation, vertical translation, and rotation along the roll axis. In FIG. 5A, the first linkage 514a of the forward yoke system 512 includes a single rod attached (e.g., fixed, mounted, fastened, etc.). In FIG. 5B, the second linkage 514b includes a rod with three links.

In FIG. 5B, the aft link 516 constrains vertical translation. Imbalances in the vertical forces additionally cause the yoke system 512 and aft link 516, collectively, react pitch moments and thusly constrain an additional degree of freedom, namely, rotation about the pitch axis. In FIG. 5B, the aft link 516 is implemented by a vertical rod.

In FIG. 5B, the implementation 511 includes thrust linkage(s) 408 to constrain translation along the roll axis. In some examples, the thrust linkage(s) 408 are joined by the yoke 416 (e.g., a whiffletree connection, etc.), which evenly distributes load between the linkages 413a, 413b. In such examples, the yoke system 512 and/or aft link 516 can include additional features that allow rotation about the yaw axis to be constrained. In other examples, the yoke 416 can be absent. In such examples, imbalances in thrust load between the linkages 413a, 413b enable the thrust linkage(s) 408 to constrain rotation about the yaw axis. An example of this configuration is further described below in conjunction with FIG. 12.

Figure 6:
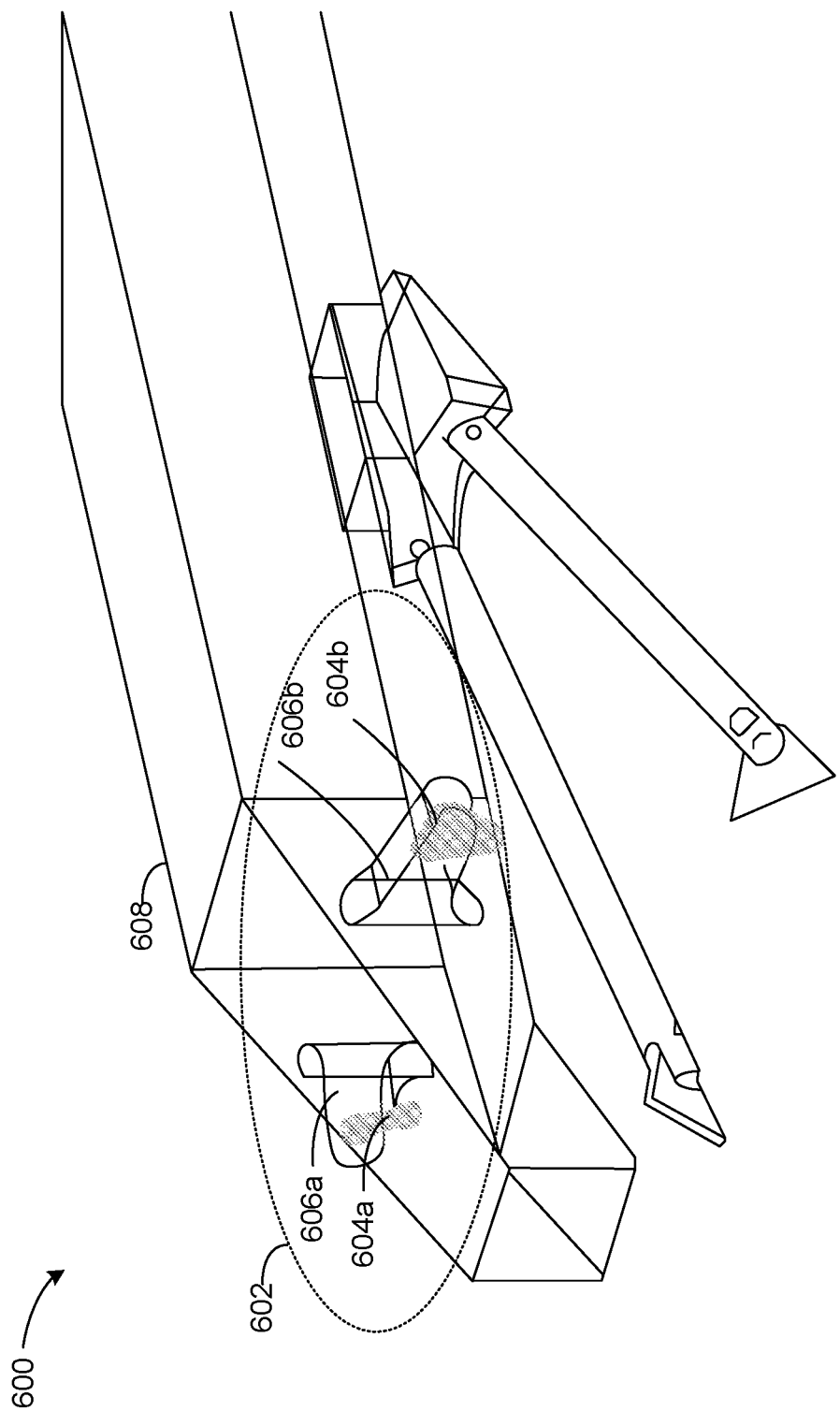
FIG. 6 illustrates an example mounting configuration that includes an aft mount with integrated fasteners.

FIG. 6 illustrates an example mounting configuration 600 that includes an aft mount 602 with integrated fasteners 604a, 604b. In FIG. 6, the aft mount 602 includes a first boss 606a and a second boss 606b, which receive the first integrated fastener 604a, and the second integrated fastener 604b respectively. In FIG. 6, the integrated fasteners are link lugs. In other examples, the integrated fasteners 604a, 604b can be any other suitable type of fastener.

The bosses 606a, 606b can be coupled to the pylon 608 via any suitable means (e.g., a weld, one or more fasteners, etc.). The stiffness of the aft mount 602 can be changed by modifying the parameters (e.g., the material, the thickness, the geometry, etc.) of the body of the pylon 604 and/or the bosses 606a, 606b. In FIG. 6, the first boss 606a and first integrated fastener 604a form a clevis, which retains the first integrated fastener 604a in the boss 606a. Similarly, the second boss 606b and the second integrated fastener 604b form a clevis, which retains the second integrated fastener 604b in the second boss 606b.

In FIG. 6, the integrated fasteners 604a, 604b and bosses 606a, 606b replace the yoke 506 of FIG. 5A. That is, the aft mount 602 constrains 3 degrees of freedom of a coupled gas turbine engine, namely lateral translation, vertical translation, and rotation about the roll axis. While the integrated fasteners 604a, 604b are described with reference to the aft mount 602, in other examples, the fasteners associated with the front mount and/or thrust linkages of the engine may similarly be integrated into the pylon.

The mounting configuration 600 including integrated fasteners 604a, 604b eliminates the need for an aft mount yoke (e.g., the yoke 506 of FIG. 5A, etc.), which reduces engine weight. Additionally, integration of the fasteners reduces the vertical height of mounting configuration 600, which improves ground clearance and allows for larger engine diameters without the need for ovalization of the engine.

FIG. 7A is a front view of a first configuration 700 of a first outer guide vane, 702a, a second outer guide vane 702b, and a third outer guide vane 702c relative to a pylon 704. FIG. 7B is a top view of the first configuration 700 of the outer guide vanes 702a, 702b, 702c. In the configuration 700 of FIGS. 7A-B, the second outer guide vane 702b is positioned vertically (e.g., along the yaw axis, perpendicular to the ground when an engine including the second outer guide vane 702b is assembled, etc.). The first outer guide vane 702a and the third outer guide vane 702c are radially displaced from the second outer guide vane 702b such that each guide vane of the first configuration 700 (not illustrated) is evenly spaced from the second outer guide vane 702b. In the illustrated examples of FIGS. 7A and 7B, the front mounts (e.g., the front mount 404) of a mounting configuration (e.g., the configuration 405 of FIGS. 4A and 4B, etc.) are to surround the second outer guide vane 702b when the gas turbine engine 400 is assembled on wing.

FIG. 8A is a front view of a second configuration 800 of a first outer guide vane 802a, a second outer guide vane 802b, a third outer guide vane 802c, and a fourth outer guide vane 802d relative to the pylon 704. FIG. 8B is a top view of the second configuration 800 of the outer guide vanes 802*a*, 802*b*, 802*c*, 802*d*. In the configuration 800 of FIGS. 8A-B, the second outer guide vane 802*b* and the third outer guide vane 802*c* are evenly displaced from the yaw-axis such that the area extending from an engine centerline 803 along the yaw axis is available to package the components of a mount configurations. That is, unlike the first configuration 700 of FIGS. 7A and 7B, the second configuration 800 allows the front mount of a mounting configuration (e.g., the front mount 404, etc.) to not intersect with the second outer guide vane 802*b* or the third outer guide vane 802*c*.

Figure 9A:
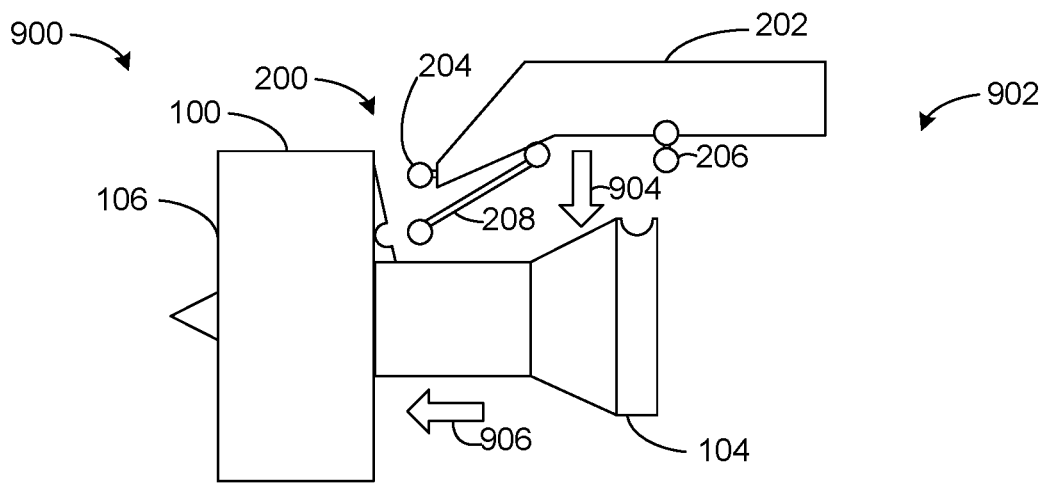
FIGS. 9A-C illustrate a prior-art process for removing the engine core of the gas turbine engine of FIG. 1.
Figure 9B:
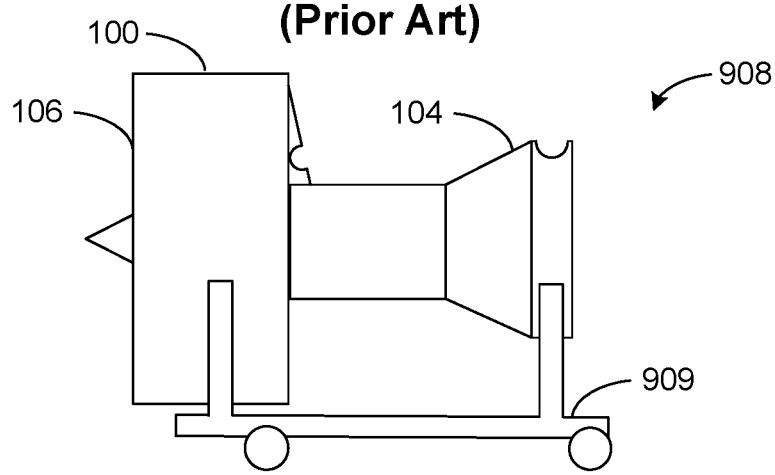
Figure 9C:
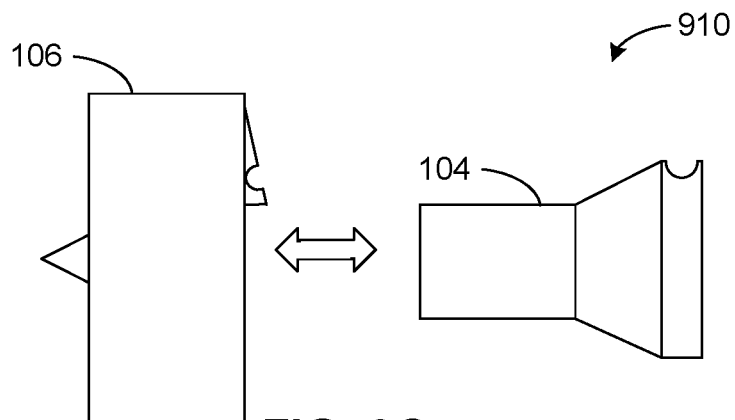

FIG. 9A-C illustrate a prior-art process 900 for removing the core turbine 104 of a gas turbine engine 100 using the first prior-art mounting configuration 200 of FIG. 2. FIG. 9A illustrates a first step 902, which includes a decoupling 904 the mounts 204, 206 and thrust linkage 208 and a removal 906 of the gas turbine engine 100 from the pylon 202. The first step 902 can take a relatively large amount of time given the complexity of the decoupling 904 the mounts 204, 206 and thrust linkage 208 and the need to secure the gas turbine engine 100 prior to the decoupling 904.

FIG. 9B illustrates a second step 908 of the prior process 900. In the second step 908, the gas turbine engine 100, now removed from the pylon 202, has been disposed on a carrier 909. The carrier 909 allows the gas turbine engine 100 to be moved to a maintenance area to be inspected, serviced, and/or repaired.

FIG. 9C illustrated a third step 910 of the prior process 900. In the third step 910, a decoupling 912 of the fan section 106 of the gas turbine engine 100 and core turbine 104 occurs. The decoupling 912 can include the removal of the fasteners coupling the fan section 106 to the core turbine 104. After the decoupling 912, the individual parts and/or components (e.g., the HP compressor 114, the combustion section 116, the high pressure turbine 118, the low pressure turbine 120, etc.) of the core turbine 104 can be serviced. As such, to service parts of core turbine 104 of gas turbine engine 100 mounted using the first prior-art mounting configuration 200, the entirety of the gas turbine engine 100 must be removed from the pylon 202.

Figure 10A:
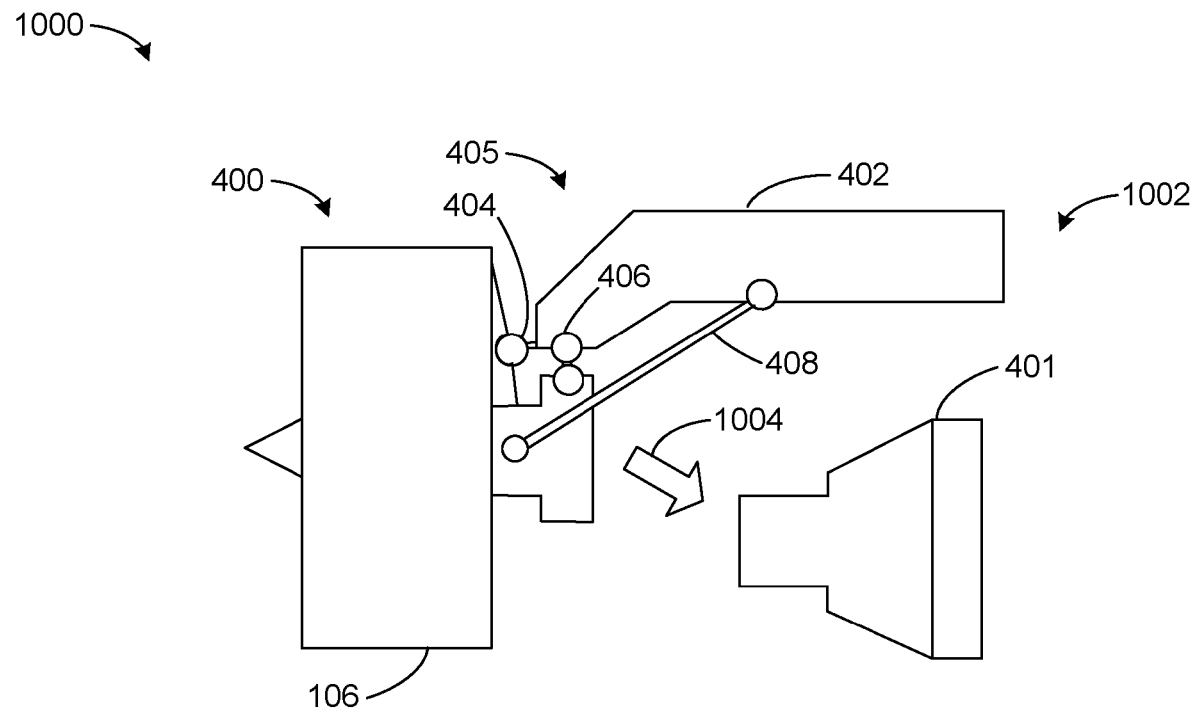
FIGS. 10A-B illustrate a process for removing the engine core of the gas turbine engine of FIG. 4A in accordance with teachings of this disclosure.
Figure 10B:
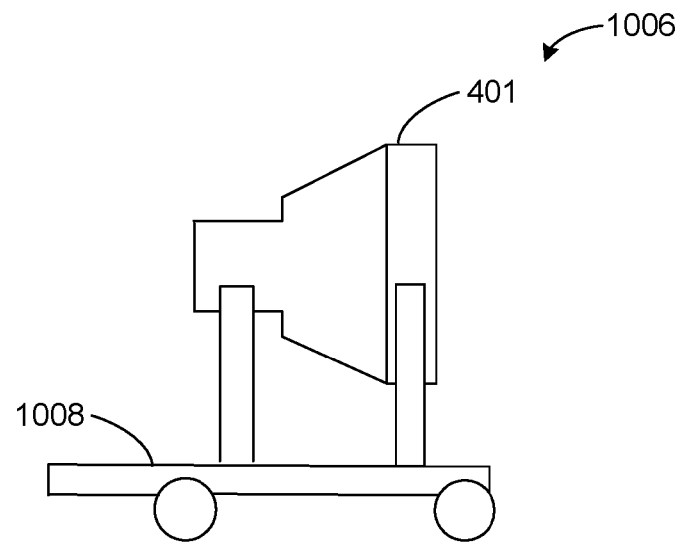

FIG. 10A-B illustrate a process 1000 for removing the core section 401 of the gas turbine engine 400 of FIG. 4A in accordance with teachings of this disclosure. FIG. 10A illustrates a first step 1002, which includes a decoupling 1004 of the cantilevered core section 401 from the fan section 106. The decoupling 1004 can include the removal of the fasteners coupling the fan section 106 to the core section 401. As such, the core section 401 can be removed from the gas turbine engine 400 on the pylon 402 without the whole removal of the gas turbine engine 400 from the pylon 402 and the decoupling of the mounts 404, 406 and thrust linkage 408.

FIG. 10B illustrates a second step 1006 of the process 1000. In the second step 1006, the core section 401, now removed from the pylon 402, has been disposed on a carrier 1008. The carrier 1008 allows the gas turbine 400 to be moved to a maintenance area to be inspected, serviced, and/or repaired. When compared to the process 900, the process 1000 enables the core section 401 of the gas turbine engine 400 be more easily serviced, inspected, etc. As such, the mounting configuration 405 reduces the time associated with servicing and inspecting the core section 401. While the illustrated examples of FIGS. 10A and 10B illustrated a ducted fan (e.g., the fan section 106, etc.), the method described in conjunction with FIGS. 10A-10B are similarly applicable to gas turbine engines with unducted fan sections (e.g., a propfan engine, etc.).

Figure 11:
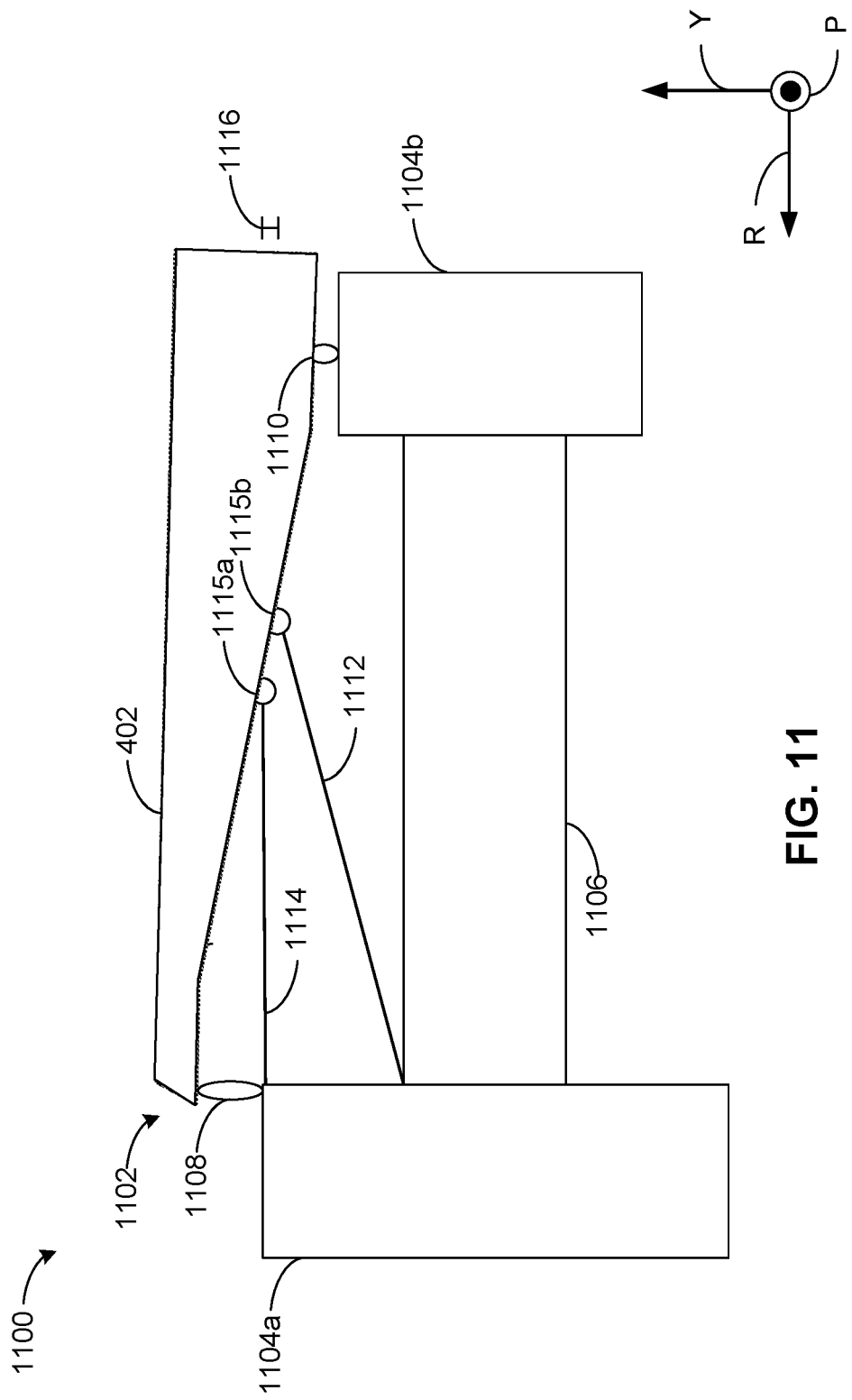
FIG. 11 is a simplified block diagram of an engine depicting a dual thrust linkage system.

FIG. 11 is a side view of a block diagram of a gas turbine engine 1100 depicting a mounting configuration 1102. The simplified gas turbine engine 1100 includes a front frame 1104*a*, a rear frame 1104*b*, and an engine carcass 1106. The example mounting configuration 1102 couples the gas turbine engine 1100 to the pylon 402 and includes a front mount 1108, an aft mount 1110, a first thrust linkage 1112, and a second thrust linkage 1114. The mounting configuration of FIG. 11 enables the pitch moment generated by the operation of the gas turbine engine to be constrained by the thrust linkages 1112, 1114 in combination, which thereby prevents the pitch moment from being transferred through the engine carcass 1106.

In FIG. 11, the front frame 1104*a* generally corresponds to the frame (e.g., 132, etc.) around a fan (e.g., the LP compressor 112 of FIG. 1, etc.), and the rear frame 1104*b* generally corresponds to the frame surrounding the low pressure turbine (e.g., the LP turbine 120, etc.). In other examples, the front frame 1104*a* can correspond to any suitable location of the gas turbine engine 1100 and rear frame 1104*b* can correspond to any suitable location on the gas turbine engine 1100 downstream of the front frame 1104*a*. The engine carcass 1106 (also referred to as the engine core 1106) refers to internal components of the engine, including the flow path components (e.g., the LP compressor 112, the high pressure compressor 114, the combustion section 116, the high pressure turbine 118, and the low pressure turbine 120, etc.) of the gas turbine engine 1100.

In FIG. 11, the front mount 1108 transfers vertical forces, lateral forces, and bending moments applied on the roll axis generated by the gas turbine engine 1100 to the pylon 402. In some examples, the front mount 1108 can be implemented by a 3-pin linkage and a 2-pin linkage. In other examples, the front mount 1108 can be implemented by another suitable linkage and/or combination thereof. In FIG. 11, the aft mount 1110 transfers lateral forces generated by the gas turbine engine 1100 to the pylon 402. In some examples, the aft mount 1110 can be implemented by a 2-pin linkage. In other examples, the aft mount 1110 can be implemented by another suitable linkage and/or combination thereof. In FIG. 11, the front mount 1108 and aft mount 1110 collectively react bending moments about the yaw axis, as both mounts 1108, 1110 react lateral forces. As such, the yaw bending moments are transferred between the mounts 1108, 1110 and through the engine carcass 1106.

In FIG. 11, the thrust linkages 1112, 1114 transfer axial forces generated by the gas turbine engine 1100 to the pylon 402. The attachment points 1115*a*, 1115*b* of the thrust linkages 1112, 1114 on the pylon 402 are separated by a vertical displacement 1116. The vertical displacement 1116 enables the thrust linkages 1112, 1114 to bear different amounts of axial loads generated by the gas turbine engine 1100. As such, this imbalance of axial forces between the thrust linkages 1112, 1114 enables the thrust linkages to transfer pitch moments generated by the gas turbine engine 1100 to the pylon 402. As such, in combination, the forward mount 1108, the aft mount 1110, and thrust linkages 1112, 1114 constrain the six degrees of freedom of the gas turbine engine 1100 (e.g., vertical translation, lateral translation, axial translation, rotation about the yaw axis, rotation about the pitch axis, and rotation about the roll axis). The mounting configuration 1102 of the forward mount 1108, the aft mount 1110 and thrust linkages 1115*a*, 1115*b* cause the gas turbine engine 1100 to be statically determinate.

In some examples, either or both of the thrust linkages 1112, 1114 can be implemented by multiple thrust linkages (e.g., two thrust linkages, three thrust linkages, etc.). In some such examples, the plurality of thrust linkages 1112 can be joined together via a yoke and/or a whiffletree connection, which evenly distributes the load between each of the plurality of thrust linkages 1112. In some such examples, the plurality of thrust linkages 1114 can be joined together via a yoke and/or whiffletree connection, which evenly distributes the load between each of the plurality of thrust linkages 1114.

Figure 12:
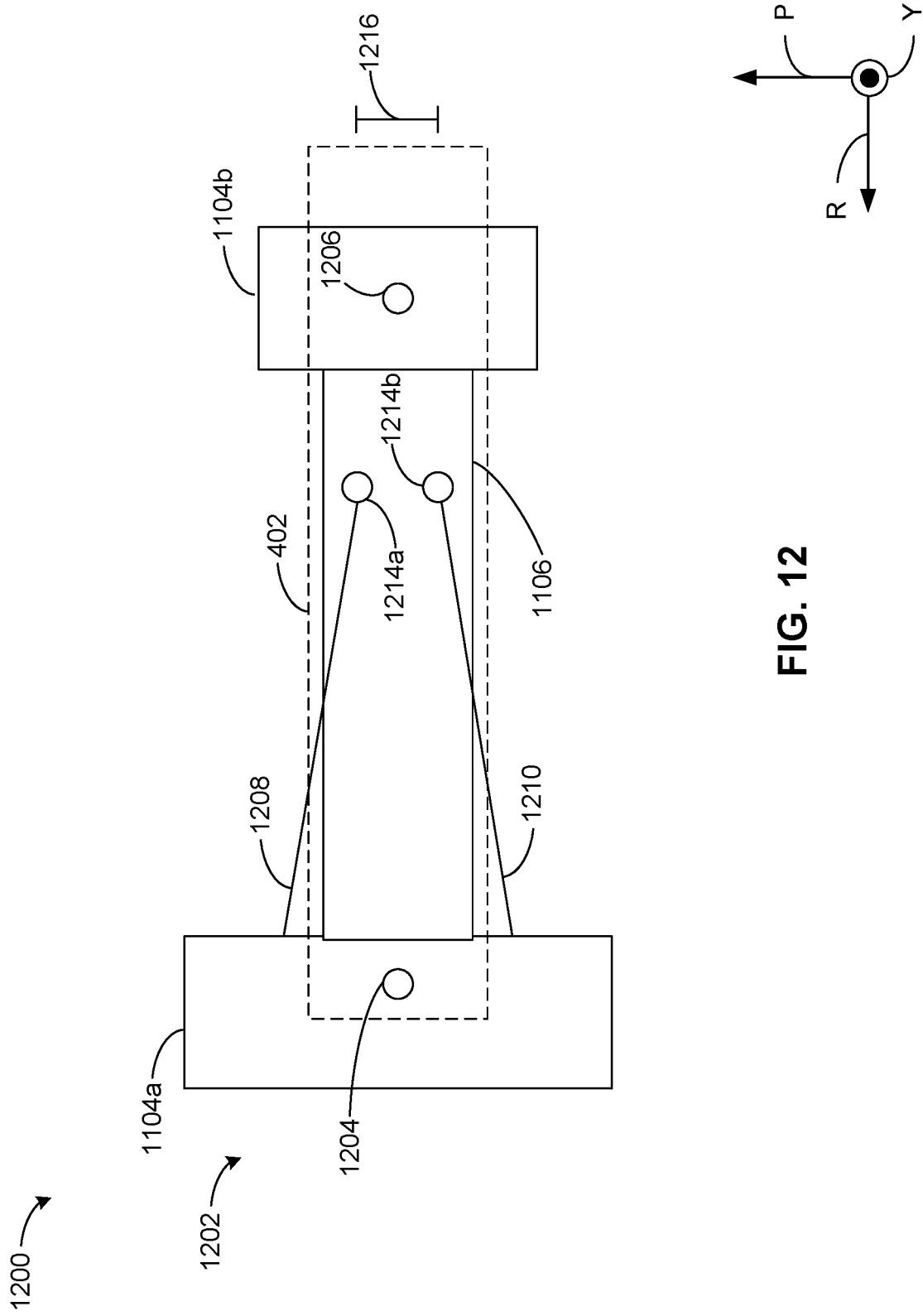
FIG. 12 is a simplified block diagram of an engine depicting another dual thrust linkage system.

FIG. 12 is a top view of a block diagram of a simplified gas turbine engine 1200 depicting a first alternative mounting configuration 1202. The simplified gas turbine engine 1200 includes the front frame 1104*a* of FIG. 11, the rear frame 1104*b* of FIG. 11, and the engine carcass 1106 of FIG. 11. The example mounting configuration 1202 couples the gas turbine engine 1200 to the pylon 402 and includes a front mount 1204, an aft mount 1206, a first thrust linkage 1208, and a second thrust linkage 1210. The mounting configuration 1202 enables the yaw moment generated by the operation of the gas turbine engine 1200 to be constrained by the thrust linkages 1208, 1210 in combination, which prevents the yaw moment from being transferred through the engine carcass 1106.

In FIG. 12, the front mount 1204 transfers vertical forces, lateral forces, and bending moments applied on the roll axis generated by the gas turbine engine 1200 to the pylon 402. In some examples, the front mount 1204 can be implemented by a 3-pin linkage and a 2-pin linkage. In other examples, the front mount 1204 can be implemented by another suitable linkage and/or combination thereof. In FIG. 12, the aft mount 1206 transfers vertical forces generated by the gas turbine engine 1200 to the pylon 402. In some examples, the aft mount 1206 can be implemented by a 2-pin linkage. In other examples, the aft mount 1206 can be implemented by another suitable linkage and/or combination thereof. In FIG. 12, the front mount 1204 and aft mount 1206 collectively react bending moments about the pitch axis, as both mounts 1204, 1206 react vertical forces. As such, the pitch bending moments are transferred between the mounts 1204, 1206 and through the engine carcass 1106.

In FIG. 12, the thrust linkages 1208, 1210 transfer axial forces generated by the gas turbine engine 1200 to the pylon 402. The attachment points 1214*a*, 1214*b* of the thrust linkages 1208, 1210 on the pylon 402 are separated by a lateral displacement 1216. The lateral displacement 1216 enables the thrust linkages 1208, 1210 to bear different amounts of axial loads generated by the gas turbine engine 1200. As such, this imbalance of axial forces between the thrust linkages 1208, 1210 enables the thrust linkages to transfer yaw moments generated by the gas turbine engine 1200 to the pylon 202. As such, in combination, the forward mount 1204, the aft mount 1206, and thrust linkages 1208, 1210 constrain the six degrees of freedom of the gas turbine engine 1200 (e.g., vertical translation, lateral translation, axial translation, rotation about the yaw axis, rotation about the pitch axis, and rotation about the roll axis). The mounting configuration 1202 of the forward mount 1204, the aft mount 1206 and thrust linkages 1214*a*, 1214*b* cause the gas turbine engine 1200 to be statically determinate.

In some examples, either or both of the thrust linkages 1208, 1210 can be implemented by multiple thrust linkages (e.g., two thrust linkages, three thrust linkages, etc.). In some such examples, the plurality of thrust linkages 1208 can be joined together via a yoke and/or a whiffletree connection, which evenly distributes the load between each of the plurality of thrust linkages 1208. In some such examples, the plurality of thrust linkages 1210 can be joined together via a yoke and/or whiffletree connection, which evenly distributes the load between each of the plurality of thrust linkages 1210.

FIGS. 13A and 13B are a simplified top view and side view, respectively, of an example gas turbine engine 1300 depicting a second alternative mounting configuration 1302. The gas turbine engine 1300 includes the front frame 1104*a* of FIG. 11, the rear frame 1104*b* of FIG. 11, and the engine carcass 1106 of FIG. 11. The example mounting configuration 1202 couples the gas turbine engine 1300 to the pylon 402 and includes a front mount 1304, an aft mount 1306, a first thrust linkage 1308, a second thrust linkage 1310, a third thrust linkage 1312. The mounting configuration 1302 enables both yaw and pitch moments generated by the operation of the gas turbine engine 1200 to be constrained by the thrust linkages 1308, 1310, 1312, which prevents the yaw moment from being transferred through the engine carcass 1106.

In FIGS. 13A and 13B, the front mount 1304 transfers vertical force and bending moments applied on the roll axis generated by the gas turbine engine 1300 to the pylon 402. In some examples, the front mount 1304 can be implemented by a 3-pin linkage. In other examples, the front mount 1304 can be implemented by another suitable linkage and/or combination thereof. In FIG. 13, the aft mount 1306 transfers lateral forces generated by the gas turbine engine 1300 to the pylon 402. Additionally or alternatively, the aft mount 1306 can transfer vertical force, lateral forces and/or bending moments applied on the roll axis generated by the gas turbine engine 1300. In such examples, the front mount 1304 transfers the remaining of the vertical force, the lateral force and the bending moments. In some examples, the aft mount 1306 can be implemented by a 2-pin linkage. In other examples, the aft mount 1306 can be implemented by another suitable linkage and/or combination thereof.

In FIGS. 13A and 13B, the thrust linkages 1308, 1310, 1312 transfer axial forces generated by the gas turbine engine 1300 to the pylon 402. The thrust linkages 1308, 1310, 1312 have attachment points 1312*a*, 1312*b*, 1312*c* to the pylon 402, respectively. The first and second attachment points 1312*a*, 1312*b* are vertical displaced from the attachment point 1312*c* by a vertical displacement 1314. Similarly, the first attachment point 1312*a* is laterally displaced from the second attachment point 1312*b* by a lateral displacement 1316. The vertical displacement 1314 and the lateral displacements 1316 allow imbalances of axial forces to occur between the thrust linkages 1308, 1310, 1312. As such, the thrust linkages 1308, 1310, 1312 can transfer yaw and pitch moments generated by the gas turbine engine 1300 to the pylon. In other examples, the thrust linkages 1308, 1310, 1312 can have any other suitable (e.g., having both vertical and lateral displacements, etc.). As such, in combination, the forward mount 1304, the aft mount 1306, and thrust linkages 1308, 1310, 1312 constrain the six degrees of freedom of the gas turbine engine 1300 (e.g., vertical translation, lateral translation, axial translation, rotation about the yaw axis, rotation about the pitch axis, and rotation about the roll axis). The mounting configuration 1302 of the forward mount 1304, the aft mount 1306 and thrust linkages 1312*a*, 1312*b*, 1312*c* cause the gas turbine engine 1300 to be statically determinate.

The examples disclosed herein negate and/or mitigate the distortions in the engine carcasses of gas turbine engines associated with bending moments generated from engine operation. Particularly, the mounting configuration 405 of FIGS. 4A and 4B minimizes the portion of the engine carcass subjected to these bending moments. Additionally, the mounting configuration 405 enables the use of the cantilever core section, which decreases the maintenance time and cost associated with servicing the cantilever core section when compared to prior art configurations. The mounting configurations 1102, 1202, 1302 in FIGS. 11, 12, and 13 cause yaw and/or pitch bending moments to be reacted between the thrust links of the gas turbine engine, which mitigate the distortions in the engine carcass associated with these bending moments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to mount a gas turbine engine to a pylon are disclosed herein.

Further aspects of the invention are provided by the subject matter of the following clauses:

1. An apparatus for mounting a gas turbine engine to a pylon, the gas turbine including an upstream section and a downstream section, the gas turbine defining a roll axis, a yaw axis, and a pitch axis, the apparatus comprising a first mount to couple the upstream section of the gas turbine engine to the pylon, a second mount to couple the upstream section of the gas turbine engine to the pylon, the second mount downstream of the first mount, and a thrust linkage to couple the upstream section to the pylon, wherein the downstream section is decouplable from the upstream section without decoupling the first mount, the second mount, and the thrust linkage.

2. An apparatus of any of the preceding clauses, wherein the upstream section includes a low pressure compressor, and the downstream section includes a high pressure compressor, a combustor, a high-pressure turbine, and a low-pressure turbine.

3. An apparatus of any of the preceding clauses, wherein the upstream section includes a low pressure compressor, and the downstream section includes a compressor, a combustor, and a turbine.

4. An apparatus of any of the preceding clauses, wherein a center of gravity of the gas turbine engine is between the first mount and the second mount, such that the upstream section is cantilevered from the downstream section.

5. An apparatus of any of the preceding clauses, wherein the first mount is coupled to a fan casing of the gas turbine engine and the second mount is coupled to an intermediate compressor casing of the gas turbine engine.

6. An apparatus of any of the preceding clauses, wherein the first mount surrounds a first outer guide vane of the gas turbine engine.

7. An apparatus of any of the preceding clauses, wherein the first outer guide vane is oriented along the yaw axis.

8. An apparatus of any of the preceding clauses, wherein the first mount is at a substantially the same position along the roll axis as a second outer guide vane of the gas turbine engine and a third outer guide vane of the gas turbine engine, the first mount disposed circumferentially between the second outer guide vane and the third outer guide vane.

9. An apparatus of any of the preceding clauses, wherein the second mount constrains rotation about the roll axis of the gas turbine, the second mount includes a first fastener disposed within the pylon, and a second fastener disposed within the pylon, the second fastener opposite the first fastener about the pylon.

10. An apparatus of any of the preceding clauses, wherein the first fastener forms a clevis with a boss of the pylon.

11. An apparatus of any of the preceding clauses, wherein the first mount includes at least one of a trunnion or a yoke, the first mount to constrain translation along the pitch axis of the gas turbine engine and translation along the yaw axis of the gas turbine engine.

12. A gas turbine engine defining a roll axis, a yaw axis, and a pitch axis, the gas turbine engine comprising a first section, a second section coupled to the first section, the second section downstream from the first section, a first mount to couple the first section of the gas turbine engine to the pylon, a second mount to couple the first section of the gas turbine engine to the pylon, the second mount downstream of the first mount, and a thrust linkage to couple the first section to the pylon, and wherein the second section can be decoupled from the upstream section without decoupling the first mount, the second mount, and the thrust linkage.

13. A gas turbine engine of any of the preceding clauses, wherein the first section includes a low pressure compressor and the second section includes a high pressure compressor, a combustor, a high-pressure turbine, and a low-pressure turbine.

14. A gas turbine engine of any of the preceding clauses, wherein the first section includes a low pressure compressor, and the second section includes a compressor, a combustor, and a turbine.

15. A gas turbine engine of any of the preceding clauses, wherein a center of gravity of the gas turbine engine is between the first mount and the second mount, such that the first section is cantilevered from the downstream section.

16. A gas turbine engine of any of the preceding clauses, wherein the first section includes a fan casing and an intermediate compressor casing, the first mount coupled to the fan casing and the second mount is coupled to the intermediate compressor casing.

17. A gas turbine engine of any of the preceding clauses, further including a first outer guide vane, the first mount surrounding the first outer guide vane.

18. A gas turbine engine of any of the preceding clauses, wherein the first outer guide vane is oriented along the yaw axis.

19. A gas turbine engine of any of the preceding clauses, wherein the first mount is at a substantially the same position along the roll axis of the gas turbine engine as a second outer guide vane of the gas turbine engine and a third outer guide vane of the gas turbine engine, the first mount disposed circumferentially between the second outer guide vane and the third outer guide vane.

20. A gas turbine engine of any of the preceding clauses, wherein the second mount constrains rotation about the roll axis, the second mount includes a first fastener disposed within the pylon, and a second fastener disposed within the pylon, the second fastener opposite the first fastener about the pylon.

21. A gas turbine engine of any of the preceding clauses, wherein the first fastener forms a clevis with a boss of the pylon.

22. A gas turbine engine of any of the preceding clauses, wherein the first mount includes at least one of a trunnion or a yoke, the first mount to constrain translation along the pitch axis of the gas turbine engine and translation along the yaw axis of the gas turbine engine.

23. An apparatus for mounting a gas turbine engine to a pylon, the apparatus comprising a first mount to couple the gas turbine engine to the pylon, a second mount to couple the gas turbine engine to the pylon, a first thrust linkage, and a second thrust linkage displaced along a first axis from the first thrust linkage, the first thrust linkage and the second thrust linkage to react a first moment generated during operation of the gas turbine engine.

24. An apparatus of any of the preceding clauses, wherein the first thrust linkage is vertically displaced from the second thrust linkage, and wherein the first moment is a moment about a pitch axis of the gas turbine engine.

25. An apparatus of any of the preceding clauses, wherein the first thrust linkage is laterally displaced from the second thrust linkage, and wherein the first moment is a moment about a yaw axis of the gas turbine engine.

26. An apparatus of any of the preceding clauses, further including a third thrust linkage displaced from the first thrust linkage along a second axis, the second axis perpendicular to the first axis, the third thrust linkage and the first thrust linkage to react a second moment, the second moment applied in a direction perpendicular to the first moment.

27. An apparatus of any of the preceding clauses, wherein the first moment is applied about a yaw axis of the gas turbine engine, and wherein the second moment is applied about a pitch axis of the gas turbine engine.

28. An apparatus of any of the preceding clauses, wherein at least one of the first thrust linkage or the second thrust linkage transfer forces applied along a roll axis to the pylon, at least one of the first mount or the second mount transfer forces applied along a pitch axis to the pylon, and at least one of the first thrust linkage or the second thrust linkage transfer forces applied along a yaw axis to the pylon.

29. An apparatus of any of the preceding clauses, wherein the first mount and the second mount are coupled to a fan section of the gas turbine engine.

30. An apparatus of any of the preceding clauses, wherein a core section of the gas turbine engine can be decoupled from a fan section of the gas turbine without decoupling the first mount and second mount from the pylon.

31. An apparatus of any of the preceding clauses, wherein the first mount includes a first fastener disposed within the pylon, and a second fastener disposed within the pylon, the second fastener opposite the first fastener.

32. An apparatus of any of the preceding clauses, wherein the first fastener forms a clevis with a boss of the pylon.

33. A gas turbine engine comprising a first section, a second section coupled to the first section, the second section downstream from the first section, a first mount to couple the first section to the pylon, a second mount to couple at least one of the first section or the second section to the pylon, a first thrust linkage, and a second thrust linkage displaced along a first axis from the first thrust linkage, the first thrust linkage and the second thrust linkage to react a first moment generated during operation of the gas turbine engine.

34. A gas turbine engine of any of the preceding clauses, wherein the first thrust linkage is vertically displaced from the second thrust linkage, and wherein the first moment is a moment about a pitch axis of the gas turbine engine.

35. A gas turbine engine of any of the preceding clauses, wherein the first thrust linkage is laterally displaced from the second thrust linkage, and wherein the first moment is a moment about a yaw axis of the gas turbine engine.

36. A gas turbine engine of any of the preceding clauses, wherein the apparatus further includes a third thrust linkage displaced from the first thrust linkage along a second axis, the second axis perpendicular to the first axis, the third thrust linkage and the first thrust linkage to react a second moment, the second moment applied in a direction perpendicular to the first moment.

37. A gas turbine engine of any of the preceding clauses, wherein the first moment is applied about a yaw axis of the gas turbine engine, and the second moment is applied about a pitch axis of the gas turbine engine.

38. A gas turbine engine of any of the preceding clauses, wherein at least one of the first thrust linkage or the second thrust linkage transfer forces applied along a roll axis to the pylon, at least one of the first mount or the second mount transfer forces applied along a pitch axis to the pylon, and at least one of the first thrust linkage or the second thrust linkage transfer forces applied along a yaw axis to the pylon.

39. A gas turbine engine of any of the preceding clauses, wherein a first mount and a second mount are coupled to the first section of the gas turbine engine.

40. A gas turbine engine of any of the preceding clauses, wherein the first section is a fan section, the second section is a core section, the second mount is disposed on the first section, and the core section decouplable from the fan section without decoupling the first mount and the second mount from the pylon.

41. A gas turbine engine of any of the preceding clauses, wherein the first mount includes a first fastener disposed within the pylon, and a second fastener disposed within the pylon, the second fastener opposite the first fastener.

42. A gas turbine engine of any of the preceding clauses, wherein the first fastener forms a clevis with a boss of the pylon.

The following claims are hereby incorporated into this Detailed Description by this reference, with each claim standing on its own as a separate embodiment of the present disclosure.

What is claimed is:

1. An apparatus for mounting a gas turbine engine to a pylon, the gas turbine engine including an upstream section and a downstream section, the gas turbine engine defining a roll axis, a yaw axis, and a pitch axis, the apparatus comprising:
   a first mount to couple the upstream section of the gas turbine engine to the pylon;
   a second mount to couple the upstream section of the gas turbine engine to the pylon, the second mount downstream of the first mount; and
   a thrust linkage to couple the upstream section to the pylon,
   wherein the downstream section is decouplable from the upstream section without decoupling the first mount, the second mount, and the thrust linkage, and a center of gravity of the gas turbine engine is between the first mount and the second mount, such that the downstream section is cantilevered from the upstream section.

2. The apparatus of claim 1, wherein at least one of (1) the first mount is to be indirectly coupled to the upstream section or (2) the second mount is to be indirectly coupled to the downstream section.

3. The apparatus of claim 1, wherein the first mount is to be coupled to a fan casing of the gas turbine engine and the second mount is to be coupled to an intermediate compressor casing of the gas turbine engine.

4. The apparatus of claim 1, wherein the first mount is to surround a first outer guide vane of the gas turbine engine.

5. The apparatus of claim 4, wherein the first outer guide vane is oriented along the yaw axis.

6. The apparatus of claim 1, wherein the first mount is to be at substantially the same position along the roll axis as a second outer guide vane of the gas turbine engine and a third outer guide vane of the gas turbine engine, the first mount disposed circumferentially between the second outer guide vane and the third outer guide vane.

7. The apparatus of claim 1, wherein the second mount constrains rotation about the roll axis of the gas turbine engine, the second mount includes:
- a first fastener disposed within the pylon; and
- a second fastener disposed within the pylon, the second fastener opposite the first fastener about the pylon.

8. The apparatus of claim 7, wherein the first fastener forms a clevis with a boss of the pylon.

9. The apparatus of claim 1, wherein the first mount includes at least one of a trunnion or a yoke, the first mount to constrain translation along the pitch axis of the gas turbine engine and translation along the yaw axis of the gas turbine engine.

10. A gas turbine engine coupled to a pylon, the gas turbine engine defining a roll axis, a yaw axis, and a pitch axis, the gas turbine engine comprising:
- a first section;
- a second section coupled to the first section, the second section downstream from the first section;
- a first mount to couple the first section of the gas turbine engine to the pylon;
- a second mount to couple the first section of the gas turbine engine to the pylon, the second mount downstream of the first mount; and
- a thrust linkage to couple the first section to the pylon,
- wherein the second section is decouplable from the first section without decoupling the first mount, the second mount, and the thrust linkage, and a center of gravity of the gas turbine engine is between the first mount and the second mount, such that the second section is cantilevered from the first section.

11. The gas turbine engine of claim 10, wherein the first section includes a low pressure compressor, and the second section includes a high pressure compressor, a combustor, a high-pressure turbine, and a low-pressure turbine.

12. The gas turbine engine of claim 10, wherein the first section includes a fan casing and an intermediate compressor casing, the first mount coupled to the fan casing and the second mount is coupled to the intermediate compressor casing.

13. The gas turbine engine of claim 10, further including a first outer guide vane, the first mount surrounding the first outer guide vane.

14. The gas turbine engine of claim 13, wherein the first outer guide vane is oriented along the yaw axis.

15. The gas turbine engine of claim 10, further including a second outer guide vane and a third outer guide vane and wherein the first mount is at a substantially the same position along the roll axis of the gas turbine engine as the second outer guide vane of the gas turbine engine and the third outer guide vane of the gas turbine engine, the first mount disposed circumferentially between the second outer guide vane and the third outer guide vane.

16. The gas turbine engine of claim 10, wherein the second mount constrains rotation about the roll axis, the second mount includes:
- a first fastener disposed within the pylon; and
- a second fastener disposed within the pylon, the second fastener opposite the first fastener about the pylon.

17. The gas turbine engine of claim 16, wherein the first fastener forms a clevis with a boss of the pylon.

18. The gas turbine engine of claim 10, wherein the first mount includes at least one of a trunnion or a yoke, the first mount to constrain translation along the pitch axis of the gas turbine engine and translation along the yaw axis of the gas turbine engine.

19. The apparatus of claim 1, wherein the downstream section is a core section.

20. The gas turbine engine of claim 10, wherein the second section is a core section.

* * * * *